(12) United States Patent  
Cotton et al.

(10) Patent No.: US 6,719,430 B2
(45) Date of Patent: Apr. 13, 2004

(54) PRECISION OPTICAL SYSTEM FOR DISPLAY PANEL

(75) Inventors: Christopher T. Cotton, Honeoye Falls, NY (US); James T. Veligdan, Manorville, NY (US)

(73) Assignee: Scram Technologies, Inc., Dunkirk, MD (US)

( * ) Notice: Subject to any disclaimer, the term of this patent is extended or adjusted under 35 U.S.C. 154(b) by 10 days.

(21) Appl. No.: 10/436,574

(22) Filed: May 13, 2003

(65) Prior Publication Data

US 2003/0218725 A1 Nov. 27, 2003

Related U.S. Application Data

(63) Continuation-in-part of application No. 10/132,028, filed on Apr. 25, 2002, which is a continuation of application No. 09/468,602, filed on Dec. 21, 1999, now Pat. No. 6,485,145.

(51) Int. Cl.[7] .............................................. G03B 21/14
(52) U.S. Cl. ....................................................... 353/69
(58) Field of Search ............................ 353/69, 70, 122, 353/98, 102; 385/116, 119, 121, 901; 359/207, 663, 669

(56) References Cited

U.S. PATENT DOCUMENTS

| | | |
|---|---|---|
| 5,274,406 A | 12/1993 | Tejima et al. |
| 5,381,502 A | 1/1995 | Veligdan |
| 5,455,882 A | 10/1995 | Veligdan |
| 5,535,025 A | 7/1996 | Hegg |
| 5,625,736 A | 4/1997 | Veligdan |
| 5,716,118 A | 2/1998 | Sato et al. |
| 5,721,416 A | 2/1998 | Burghardt et al. |
| 5,900,993 A | 5/1999 | Betensky |
| 5,909,325 A | 6/1999 | Kuba et al. |
| 6,002,826 A | 12/1999 | Veligdan |
| 6,012,816 A | 1/2000 | Beiser |
| 6,222,971 B1 | 4/2001 | Veligdan et al. |
| 6,301,417 B1 | 10/2001 | Biscardi et al. |
| 6,307,995 B1 | 10/2001 | Veligdan |
| 6,317,545 B1 | 11/2001 | Veligdan |
| 6,328,448 B1 | 12/2001 | Beiser |
| 6,457,834 B1 | 10/2002 | Cotton et al. |
| 6,485,145 B1 * | 11/2002 | Cotton et al. ................. 353/69 |
| 6,513,935 B2 | 2/2003 | Ogawa |
| 6,527,397 B2 | 3/2003 | Furuichi et al. |

* cited by examiner

Primary Examiner—William Dowling
(74) Attorney, Agent, or Firm—Reed Smith LLP; William J. McNichol, Jr.; Matthew J. Esserman

(57) ABSTRACT

An ultrathin optical panel, and a method of producing an ultrathin optical panel, are disclosed, including stacking a plurality of glass sheets, which sheets may be coated with a transparent cladding substance or may be uncoated, fastening together the plurality of stacked coated glass sheets using an epoxy or ultraviolet adhesive, applying uniform pressure to the stack, curing the stack, sawing the stack to form an inlet face on a side of the stack and an outlet face on an opposed side of the stack, bonding a coupler to the inlet face of the stack, and fastening the stack, having the coupler bonded thereto, within a rectangular housing having an open front which is aligned with the outlet face, the rectangular housing having therein a light generator which is optically aligned with the coupler. The light generator is preferably placed parallel to and proximate with the inlet face, thereby allowing for a reduction in the depth of the housing. An alternative to this type of light generator is an optical system for producing an accurate image on a highly tilted optical panel inlet face surface relative to the image path. The optical system comprises an image source, an anamorphic system/telescope for reducing anamorphic distortion of the image, and optionally a telecentric element for preventing keystone-type distortion of the image.

33 Claims, 10 Drawing Sheets

PRECISION OPTICAL SYSTEM FOR DISPLAY PANEL

This application is a continuation-in-part of U.S. patent application Ser. No. 10/132,028, filed Apr. 25, 2002, which is a continuation of U.S. patent application Ser. No. 09/468,602, filed Dec. 21, 1999; now U.S. Pat. No. 6,485,145.

BACKGROUND OF THE INVENTION

1. Field of the Invention

The present invention relates generally to the field of display devices. In particular, the present invention relates to an optical system and method for coupling an image of an object onto a display device. More specifically, the present invention relates to an optical system and method for coupling an image of an object onto an ultrathin planar optical display device which is capable of reducing or eliminating distortions that typically occur when an image is projected onto a display device which is tilted in relation to the incident image.

2. Description of the Background

Optical screens typically use cathode ray tubes (CRTs) for projecting images onto the screen. The standard screen has a width to height ratio of 4:3 with 525 vertical lines of resolution. An electron beam is scanned both horizontally and vertically across the screen to form a number of pixels which collectively form the image.

Conventional cathode ray tubes have a practical limit in size, and are relatively deep to accommodate the required electron gun. Larger screens are available which typically include various forms of image projection. However, such screens have various viewing shortcomings including limited viewing angle, resolution, brightness, and contrast, and such screens are typically relatively cumbersome in weight and shape. Furthermore, it is desirable for screens of any size to appear black in order to improve viewing contrast. However, it is impossible for direct view CRTs to actually be black because they utilize phosphors to form images, and those phosphors are non-black.

Optical panels may be made by stacking optical waveguides, each waveguide having a first end and a second end, wherein an outlet face is defined by the plurality of first ends, and wherein an inlet face is defined by the plurality of second ends. Such a panel may be thin in its depth compared to its height and width, and the cladding of the waveguides may be made black to increase the black surface area, but such a panel may require expensive and cumbersome projection equipment to distribute the image light across the inlet face, which equipment thereby increases the total size and cost of the panel.

Therefore, the need exists for an optical panel which possesses the advantages corresponding to a stacked waveguide panel, but which does not require the use of expensive and cumbersome projection equipment, nor suffer from the increase in size and cost necessitated by such equipment.

In optical panels where the depth of the housing (containing the optical panel and projection equipment) is desired to be at a minimum, the projection equipment is typically positioned to accommodate these overall dimension constraints. The positioning of the projection equipment may therefore require the image path to be directed at an acute angle with respect to the targeted inlet face of the panel. Thus, since the surface of the inlet face is generally highly tilted relative to the image path, an imaging system which is capable of producing an image which is focused and is without distortions is critical. Not only is a properly focused image desired, but an image produced on the surface of the inlet face must also retain the aspect ratio of the original object while maintaining a linear point-to-point mapping of the object to the image.

Therefore, the need also exists for an optical system for an optical panel which is capable of producing an accurate image on a highly tilted inlet face surface relative to the image path, and which does not suffer from improperly focused images and image distortions which yield false aspect ratios of the original object and inconsistent, linear point-to-point mapping of the object to the image.

SUMMARY OF THE INVENTION

The present invention is directed to an optical system for projecting an image of an object onto a display image plane of an optical panel at an incident angle which is greater than zero. The optical system comprises an image source and an imaging element. The imaging element creates an image of the object. The optical system also comprises an anamorphic element for reducing anamorphic distortion of the image and a telecentric element for reducing keystone-type distortion of the image. The present invention is also directed to a display system which includes the combination of an optical system and an optical panel.

The present invention solves problems experienced in the prior art, such as the use of expensive and cumbersome projection equipment, by providing an optical system having a reduced optical path that produces an accurate image on a highly tilted inlet face surface relative to the image path, and which does not suffer from improperly focused images and image distortions which yield false aspect ratios of the original object and inconsistent, linear point-to-point mapping of the object to the image. The present invention also retains the advantages which correspond to a stacked waveguide panel, such as improved contrast and minimized depth.

Those and other advantages and benefits of the present invention will become apparent from the detailed description of the invention hereinbelow.

BRIEF DESCRIPTION OF THE SEVERAL VIEWS OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
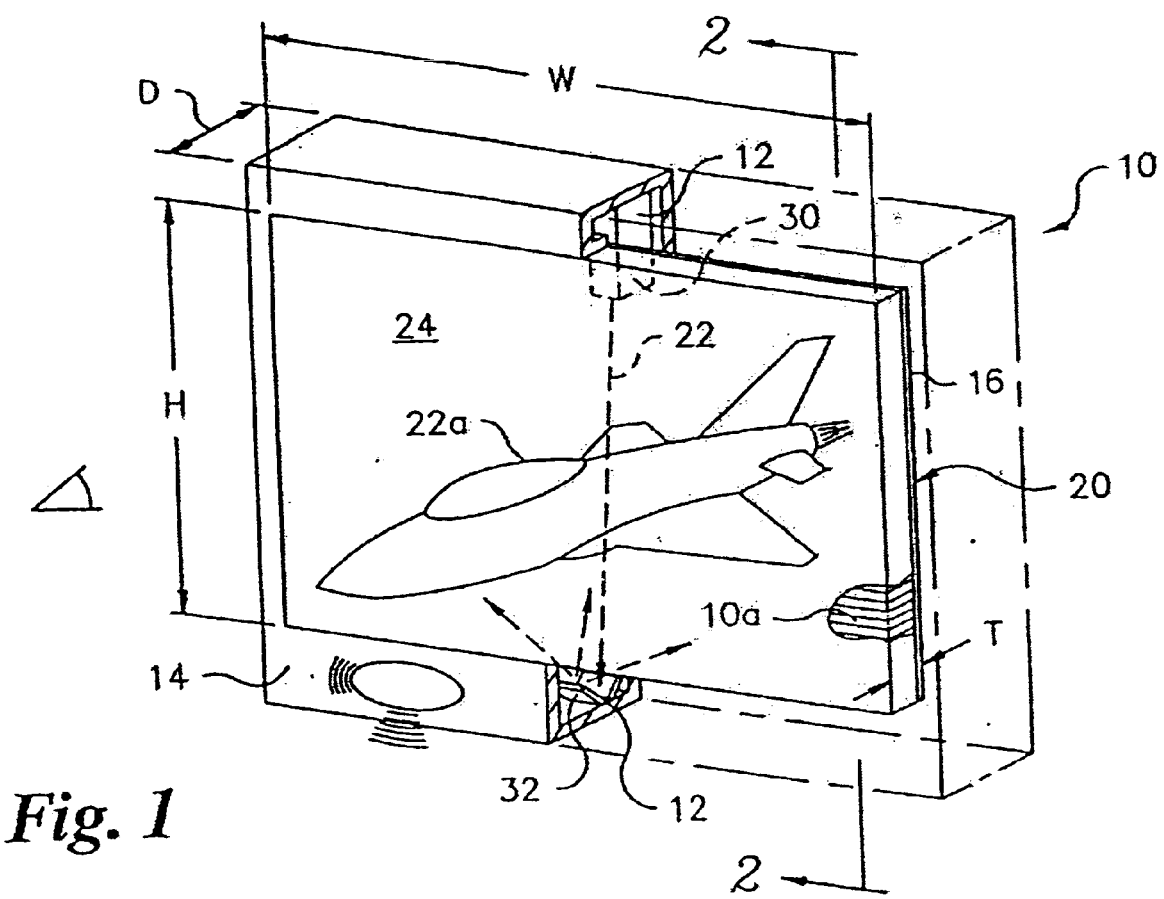
FIG. 1 is an isometric view schematic illustrating an ultrathin optical panel.

FIG. 1 is an isometric view schematic illustrating an optical panel 10. The optical panel 10 includes a plurality of waveguides 10a, wherein one end of each waveguide 10a forms an inlet for that waveguide, and wherein the opposite end of each waveguide 10a forms an outlet for that waveguide 10a, a light generation system 12, a housing 14 in which the light generation system 12 and the plurality of waveguides 10a are mounted, and a coupler 16.

Each waveguide 10a extends horizontally, and the plurality of stacked waveguides 10a extends vertically. The plurality of inlet ends define an inlet face 20 for receiving image light 22. The plurality of outlet ends define an outlet face 24 disposed substantially parallel with the inlet face 20 for displaying light 22. The light 22 may be displayed in a form such as, but not limited to, a video image 22a.

The housing 14 is sized larger in height and width than the combination of the light generation system 12 and the plurality of waveguides 10a, to allow the placement of the plurality 10a and light generation system 12 therein. The housing 14 has an open front to allow for viewing of the outlet face 24, and has a closed depth D looking from the open front to the back of the housing 14.

The light generation system 12 provides the light viewed through the waveguides 10a. The light generation system 12 includes a light source 30, and a light redirection element 32 that redirects incident light 22 from the light source 30 into the coupler 16, which light redirection element 32, in combination with the coupler 16, allows for a reduction in the depth D of the housing 14. This reduction allowance occurs where the light redirection element 32 is configured for turning the light 22 from a source 30, which source 30 is placed within the housing 14 proximate to and parallel with the vertical stack of the plurality of waveguides 10a, into the coupler 16, which then acutely turns the light 22 into the waveguides 10a. The coupler 16 is preferably effective for turning the image light in an exemplary range of about 45° up to about 90°, in order to generate approximately horizontal transmission through the plurality of waveguides 10a. The light generation system 12 may also include a modulator and further imaging optics. This light generation system 12 is discussed with more particularity with respect to FIG. 2.

The parallel surfaces of the inlet face 20 and the outlet face 24 allow the panel 10 and enclosing housing 14 to be made ultrathin in depth. The panel 10 has a nominal thickness T which is the depth of the waveguides 10a between the inlet face 20 and the outlet face 24, and thickness T is substantially less than the height H and width W of the outlet face 24. The panel 10 may be configured in typical television width to height ratios of 4:3 or 16:9, for example. For a height H of about 100 cm and a width W of about 133 cm, the panel thickness T of the present invention may be about 1 cm. The depth D may vary accordingly with the thickness T, but, in the embodiment described hereinabove, the depth D of the housing 14 is preferably no greater than about 12 cm.

Figure 2:
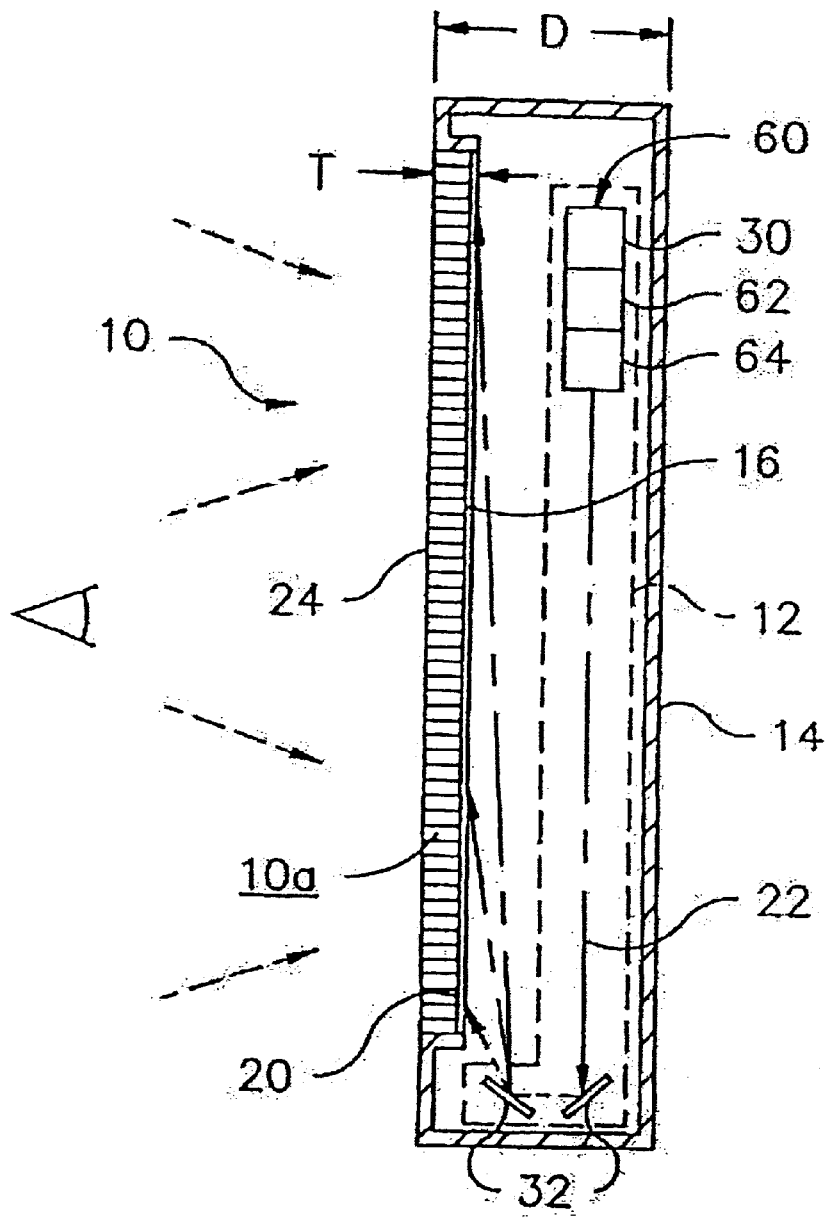
FIG. 2 is a side view cross sectional schematic of an ultrathin optical panel.

FIG. 2 is a side view cross sectional schematic of an ultrathin optical panel 10. The panel 10 includes a plurality of stacked waveguides 10a, a light generation system 12, a coupler 16, and a housing 14.

The light generation system 12, in one embodiment of the present invention, includes a projector 60 which is optically aligned with a light redirection element 32. An image is projected onto the light redirection element 32, and is then redirected to the coupler 16 for transmission through the waveguides 10a for display on the outlet face 24. In a preferred embodiment, the projector 60 is disposed adjacent to the top of the inlet face 20 for projecting the image light 22 generally parallel thereto, and is spaced therefrom a distance sufficient to allow for a turning of the image light 22 from the light redirection element 32 into the coupler 16 for transmission through the waveguides 10a.

The projector 60 may include a suitable light source 30 for producing the light 22. The light source 30 may be a light bulb (e.g. filament or arc type) or laser. The projector 60 may be a slide projector or video projector which may include a modulator 62 for modulating the light 22 to form an image 22a. The modulator 62 may be, for example, a conventional Liquid Crystal Display (LCD), a Digital Micromirror Device (DMD), a GLV, a laser raster scanner, a PDLC, an LCOS, a MEMS, or a CRT. The projector 60 may also include suitable image optics 64 for distributing or broadcasting the image light 22 horizontally and vertically across the light redirection element 32 for properly focused transmission to the coupler 16. The image optics 64 may include focusing and expanding lenses and/or mirrors. One or more light generation systems 12, such as between 2 and 4 such systems, may be used to provide light to one or more portions of the coupler 16. Expansion lenses may be used for both the imaging optics 64 and the light redirection element 32 to expand the image light 22 both vertically and horizontally over the coupler 16. Alternatively, suitable rastering systems may be used as the light generation system 12 to form the image by rastering the image light 22 both horizontally and vertically across the coupler 16.

In the illustrated embodiment, the light 22 is initially projected from the projector 60 vertically downward inside the housing 14 to the bottom thereof where the light redirection elements 32 are mounted, and the light redirection elements 32 then redirect the image light 22 vertically upwardly at a small acute angle for broadcast over the entire exposed surface of the coupler 16. In an alternative embodiment, the projector 60 could be placed beneath the inlet face 20 rather than behind the inlet face 20.

The allowable incidence angle of the image light 22 on the coupler 16 is determined by the capability of the coupler 16 to turn the light 22 into the inlet face 20 of the panel 10. The greater the turning capability of the coupler 16, the closer the projector 60 may be mounted to the coupler 16 for reducing the required depth D of the housing 14.

Figure 3:
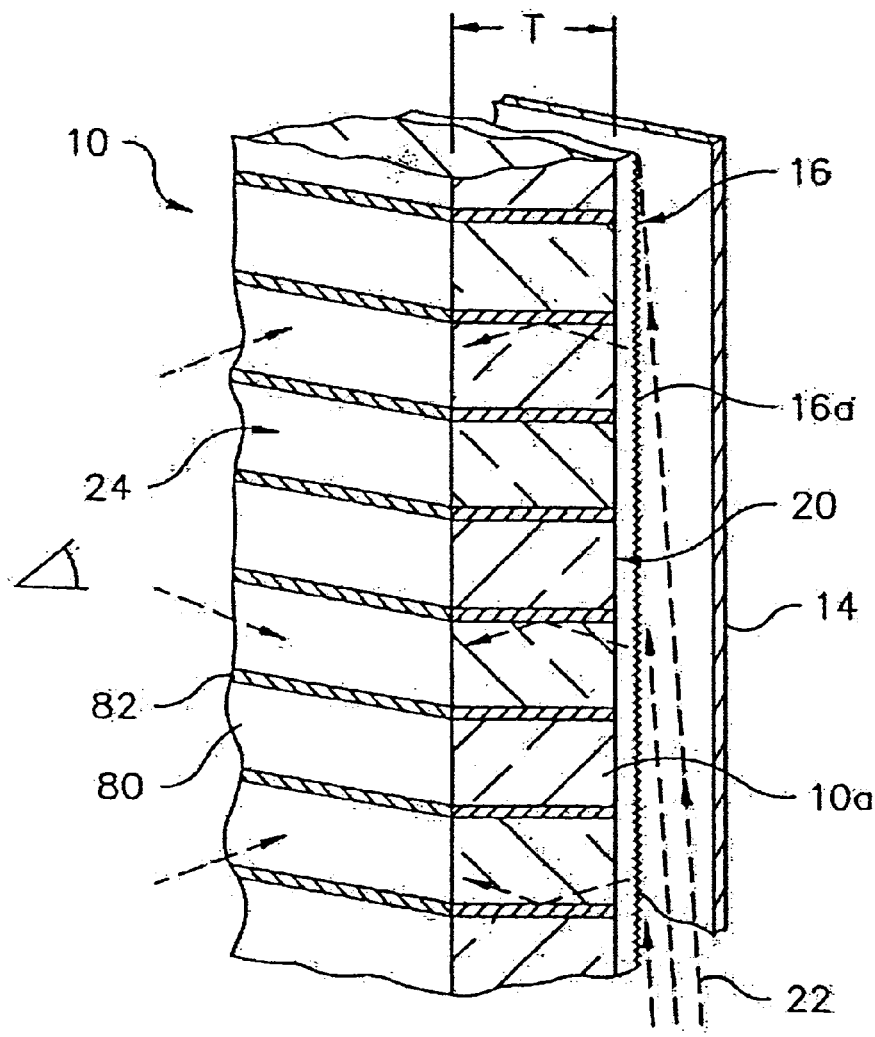
FIG. 3 is a schematic illustrating a horizontal and vertical cross section of an ultrathin optical panel using a prismatic coupler.

FIG. 3 is a schematic illustrating a horizontal and vertical cross section of an ultrathin optical panel 10. The panel 10 includes a plurality of vertically stacked optical waveguides 10a, a light generation system 12 (see FIG. 2), a coupler 16, and a housing 14.

Each waveguide 10a of the plurality of waveguides 10a includes a central transparent core 80 having a first index of refraction. The core 80 may be formed of any material known in the art to be suitable for passing light waves therethrough, such as, but not limited to plexiglass or polymers. The central core 80 may be formed of an optically transmissive material, such as an optical plastic, e.g. Lekan®, commercially available from the General Electric Company®, or glass, such as type BK7. An embodiment of the present invention is implemented using individual glass sheets, which are typically in the range between 2 and 100 microns thick, and which may be of a manageable length and width. The central core 80 is laminated between at least two cladding layers 82. The cladding layers 82 immediately in contact with the glass have a second index of refraction lower than that of the cores 80, thus allowing for substantially total internal reflection of the light 22 as it is transmitted through the cores 80. The cladding 82 may be a suitable plastic, plexiglass, glass, adhesive, polyurethane, low refractive index polymer, or epoxy, for example, and is preferably black in color. Where multiple cladding layers 82 are used, it is preferable that a clear cladding layer contact the glass, and a black pigmented layer be disposed between adjacent clear cladding layers, thus improving both viewing contrast of the outlet face 24 and internal reflection of the light 22 through the core 80. The use of at least one black pigmented layer provides improved contrast by providing additional blackness at the outlet face 24. Further, the exposed edges of the black pigmented layer at the outlet face 24 are directly viewable by the observer. Additionally, ambient light which enters the waveguides off-axis through the outlet face 24 will be absorbed internally by the black pigmented layer. The black pigmented layer may be formed in any suitable manner such as with black spray paint, or carbon particles within an epoxy adhesive joining together the adjacent cores 80 in one or more black pigmented layers. The manner of forming the cladding layers 82 and cores 80 is discussed with more specificity hereinbelow.

The waveguides 10a of the preferred embodiment are in the form of flat ribbons extending continuously in the horizontal direction along the width of the outlet face 24. The ribbon waveguides 10a are preferably stacked vertically along the height of the outlet face 24. The vertical resolution of the panel 10 is thus dependent on the number of waveguides 10a stacked along the height of the outlet face 24. For example, a stacking of 525 waveguides would provide 525 vertical lines of resolution.

The plurality of stacked waveguides 10a may be formed by first laying a first glass sheet in a trough sized slightly larger than the first glass sheet. The trough may then be filled with a thermally curing epoxy. The epoxy is preferably black, in order to form a black layer between waveguides, thereby providing improved viewing contrast. Furthermore, the epoxy should possess the properties of a suitable cladding layer 82, such as having a lower index of refraction than the glass sheets to allow substantially total internal reflection of the light 22 within the glass sheet. After filling of the trough, glass sheets 80 are repeatedly stacked, and a layer of epoxy forms between each glass sheet 80. The stacking is preferably repeated until between approximately 500 and 800 sheets have been stacked. Uniform pressure may then be applied to the stack, thereby causing the epoxy to flow to a generally uniform level between glass sheets 80. In a preferred embodiment of the present invention, the uniform level obtained is approximately 0.0002" between glass sheets 80. The stack may then be baked to cure at 80 degrees Celsius for such time as is necessary to cure the epoxy, and the stack is then allowed to cool slowly in order to prevent cracking of the glass. After curing, the stack may be placed against a saw, such as, but not limited to, a diamond saw, and cut to a desired size. The cut portions of the panel 10 may then be polished with a diamond polisher to remove any saw marks.

In an alternative embodiment of the present invention, a plurality of glass sheets 80 are individually coated with, or dipped within, a substance having an index of refraction lower than that of the glass, and the plurality of coated sheets are fastened together using glue or thermally curing epoxy, which is preferably black in color. A first coated glass sheet 10a is placed in a trough sized slightly larger than the first coated glass sheet 10a, the trough is filled with a thermally curing black epoxy, and the coated glass sheets 10a are repeatedly stacked, forming a layer of epoxy between each coated glass sheet 10a. The stacking is preferably repeated until between approximately 500 and 800 sheets have been stacked. Uniform pressure may then be applied to the stack, followed by a cure of the epoxy, and a sawing of the stack into a desired size. The stack may be sawed curved or flat, and may be frosted or polished after sawing.

In another alternative embodiment of the present invention, the glass sheets 80 preferably have a width in the range between 0.5" and 1.0", and are of a manageable length, such as between 12" and 36". The sheets 80 are stacked, with a layer of black ultraviolet adhesive being placed between each sheet 80. Ultraviolet radiation is then used to cure each adhesive layer, and the stack may then be cut and/or polished.

After sawing and/or polishing the stack, each of the above embodiments of the method so includes bonding a coupler 16 to the inlet face 20 of the stack, and fastening the stack, having the coupler 16 bonded thereto, within the rectangular housing 14. The stack is fastened such that the open front of the housing 14 is aligned with the outlet face 24, and the light generator 12 within the housing 14 is optically aligned with the coupler 16.

The light generation system 12 provides light 22 which is incident on the coupler 16, and is substantially as discussed with respect to FIG. 2. The light source 30 of the light generation system 12 may be mounted within the housing 14 in a suitable location to minimize the volume and depth of the housing 14. The source 30 is preferably mounted within the housing 14 directly behind the inlet face 20 at the top thereof to initially project light 22 vertically downwardly, which light 22 is then turned by light redirection elements 32 of the light generation system 12 vertically upwardly to optically engage the coupler 16. In a preferred embodiment of the present invention, the individual waveguides 10a extend horizontally without inclination, thus allowing the image to be transmitted directly horizontally through the waveguides 10a for direct viewing by an observer, thereby allowing the viewer to receive full intensity of the light 22 for maximum brightness. A sheet of diffusing material may optionally be provided on the outlet face 24 to effect an improved viewing angle of the display. Alternatively, instead of a sheet of diffusing material, a diffusing surface may be formed into the outlet face 24 itself to effect a similarly improved viewing angle. Thus, for maximum brightness, the light 22 incident from the light generation system 12 must be turned substantially horizontally. A prismatic coupler 16 may be used to turn the light at an angle up to 90 degrees for entry into the inlet face 20. In one embodiment of the present invention, a Transmissive Right Angle Film (TRAF) turns the light at an angle of 81 degrees.

The light coupler 16 adjoins the entire inlet face 20 and may be suitably bonded thereto for coupling or redirecting the light 22 incident from the light generation system 12 into the inlet face 20 for transmission through the waveguides 10a. The waveguides 10a of the present invention may have a limited acceptance angle for receiving incident light 22, and the coupler 16 is aligned to ensure that the image light 22 is suitably turned to enter the waveguide cores 80 within the allowable acceptance angle.

In a preferred embodiment of the present invention, the coupler 16 includes Fresnel prismatic grooves 16 a that are straight along the width of the inlet face 20 and are spaced vertically apart along the height of the inlet face 20, which prismatic coupler 16 is capable of turning light up to an angle of 90 degrees. In another preferred embodiment of the present invention, the prismatic coupler 16 is a TRAF commercially available from the 3M Company® of St. Paul, Minn., under the tradename TRAF II®. An optional reflector may be disposed closely adjacent to the prismatic coupler 16 for reflecting back into the waveguides 10a any stray light 22 at the grooves 16a. As still another preferred embodiment of the present invention, the coupler 16 (or light redirecting surface) may instead be formed into the inlet face 20 itself.

The coupler 16 may also take the form of a diffractive element 16. The diffractive coupler 16 includes a diffractive grating having a large number of small grooves extending horizontally and parallel with the individual waveguides 10a, which grooves are closely spaced together in the vertical direction over the height of the inlet face 20. The coupler 16 may take other forms as well, including, but not limited to, holographic elements.

The housing 14 supports the waveguide stack 10a and the light generation system 12 in a substantially closed enclosure. The outlet face 24 faces outwardly and is exposed to the viewer and ambient light, and the inlet face 20 and adjoining coupler 16 face inwardly toward preferably black surfaces within the housing 14, thereby providing additional black for contrast at the outlet face 24. This additional black is provided at the outlet face 24 due to the passive nature of the waveguides 10a and the coupler 16. When these passive devices are enclosed in a black area, the outlet face 24 will appear black when not illuminated by image light 22 incident on the inlet face 20.

Figure 4:
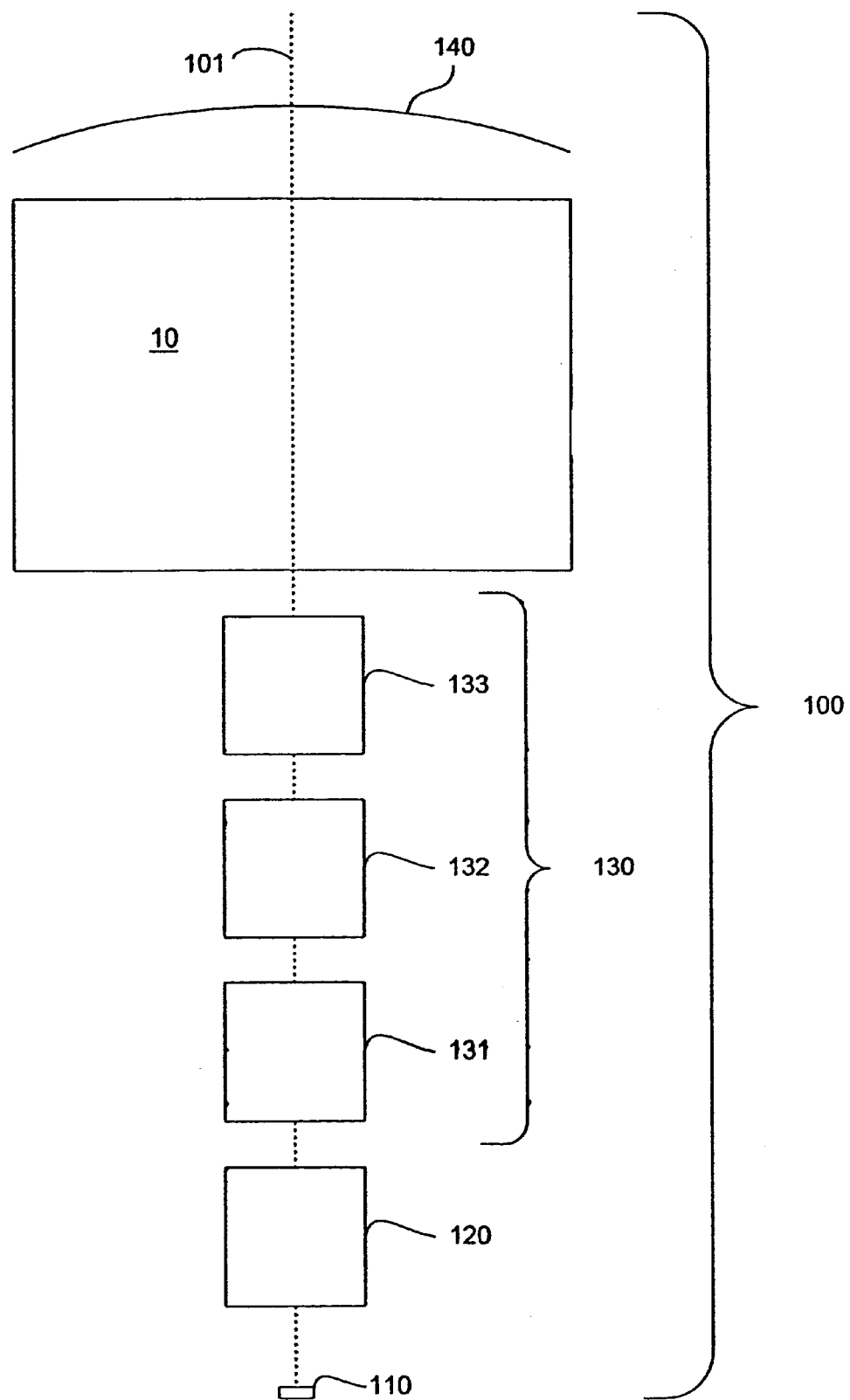
FIG. 4 is a simplified rear view schematic illustrating an optical system in conjunction with an optical panel.

FIG. 4 is a simplified rear view schematic illustrating an, optical system 100 used to project an image from an image source 10 onto an optical panel 10 (also shown for illustration purposes in FIG. 4). The optical system 100 may replace the light generation system 12 as described above in conjunction with FIG. 2. The optical system 100 includes an image source 110, an imaging element 120, an anamorphic element 130, and a telecentric element 140. The optical panel 10 may be of the type described in the embodiments above with respect to FIGS. 1–3. Alternatively, the optical panel ma be of different type dependent on design choice or routine experimentation by the skilled artisan. The image source 110, imaging element 120, anamorphic element 130, and telecentric element 140 are all nominally symmetric about a single plane that ideally contains all of the centers of curvature of the optical elements. For purposes of this, discussion only, this plane will be referred to herein as the "y-z plane".

Figure 5:
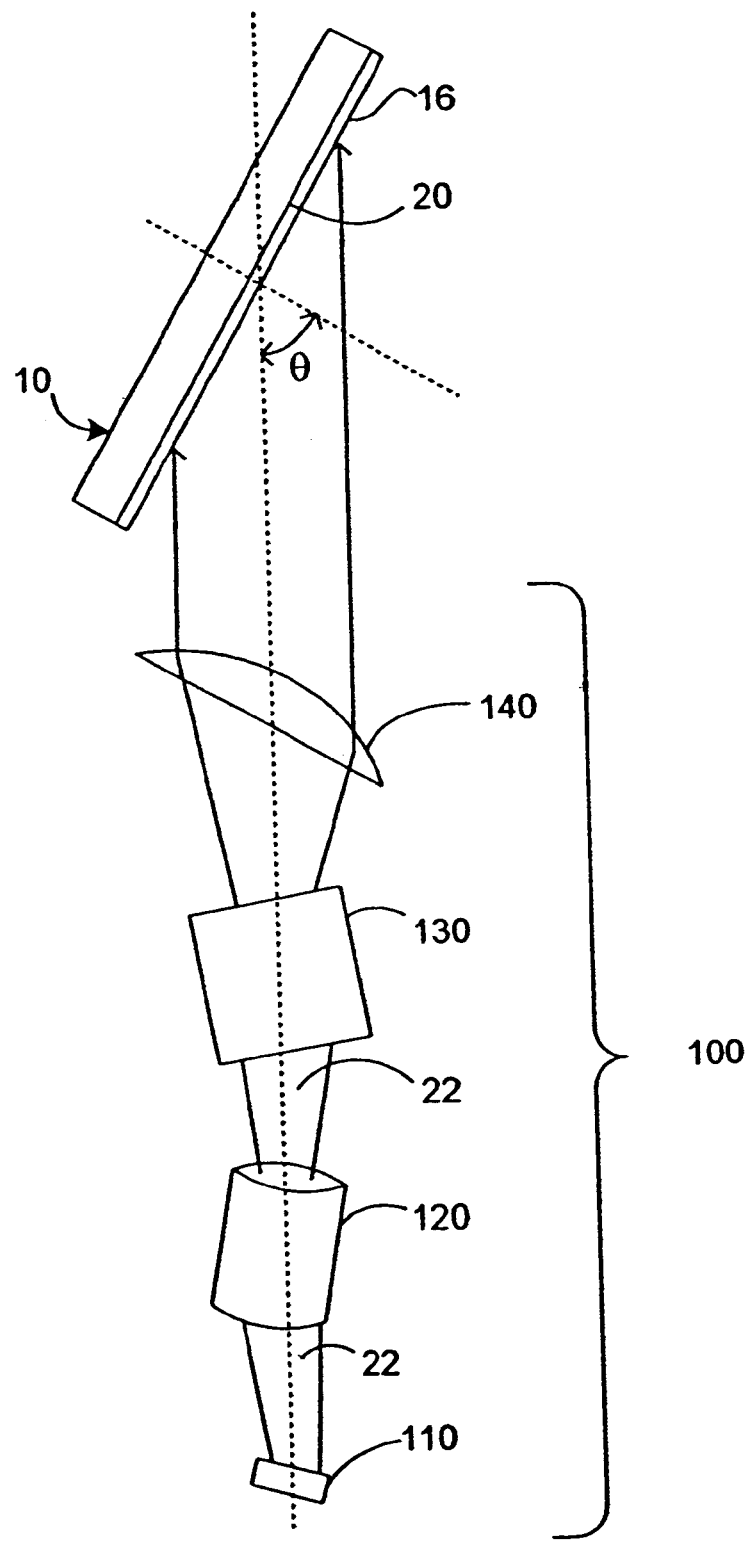
FIG. 5 is a side view cross sectional schematic of an ultrathin optical panel using a preferred optical system including a telecentric lens element.
Figure 6:
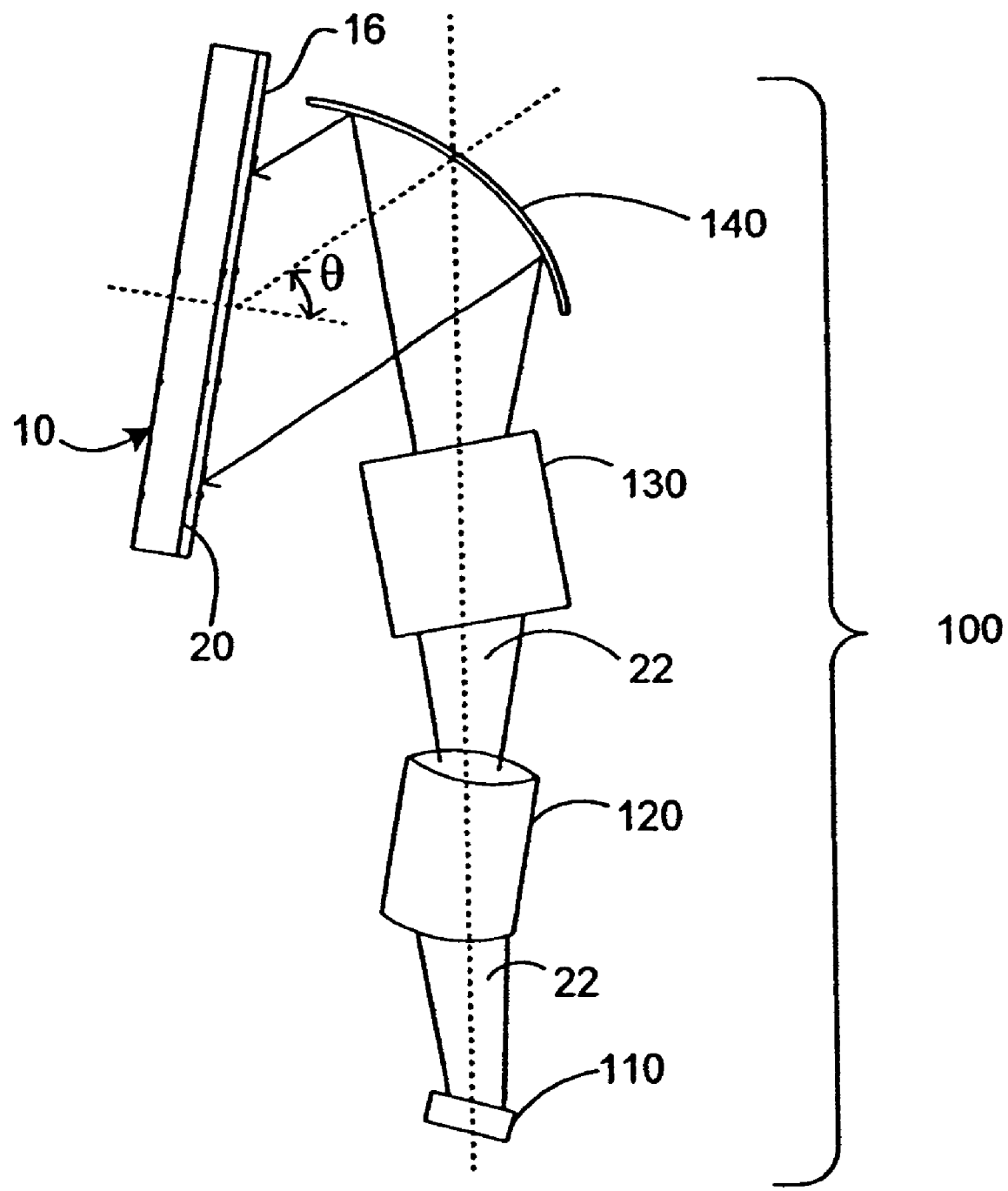
FIG. 6 is a side view cross sectional schematic of an ultrathin optical panel using another preferred optical system including a telecentric mirror element.

As used herein, the incident angle θ is defined as the angle formed between a line drawn from the center of the object plane to the center of the display image plane, and a line perpendicular to the display image plane. This is illustrated in FIG. 5 in which the projection system uses lenses, not mirrors. In embodiments where mirrors are used as optical elements in the projection system, the line from the center of the object plane to the center of the display image plane is "folded" or "reflected", as shown in FIG. 6, where the telecentric element is a mirror. The image is projected onto the display image plane at an incident angle θ greater than zero. In a preferred embodiment of the invention, incident angle θ is in the range of approximately 50°–85°. In a more preferred embodiment of the invention, incident angle θ is approximately 78°.

Since the tilt associated with this configuration is substantial, optical tilting of the image plane is preferably spread out gradually over the entire optical train. In other words, the optical elements in the optical train, i.e. the imaging element 120, the anamorphic element 130, and the telecentric element 140, each effect a tilt on the image of the object. Although it is possible to accomplish this using only one or some of the optical elements in the optical train. The image source 10 and the-imaging element 120 are each tilted about the x-axis. Tilting both the image source 110 and the imaging element 120 in this way makes use of the Scheimflug rule to effect an intermediate tilt on the image-plane.

The imaging element 120 creates a tilted image of the object. The anamorphic element 130 and telecentric element 140 are also tilted about the x-axis to effect a further intermediate tilt on the image-plane. Although the tilting by the anamorphic element 130 is not required for the optical system 100 to produce a tilted image, it is useful to provide some degree of tilt by the anamorphic element 130 to thereby improve image quality.

The image source 110 may be an illuminated object, e.g. an LCD or a DMD, or an emissive object, e.g. an LED array or a laser. The imaging element 120 preferably comprises a rotationally symmetric surface and is comprised of glass or plastic, which may contain spherical aspherical surfaces.

The anamorphic element 130 is provided in the optical system 100 mainly for reducing anamorphic distortion of the image and is preferably positioned subsequent the imaging element 120 within the optical path of the optical system 100. Although, in some configurations, it may be desirable to position the imaging element 120 subsequent the anamorphic element 130 within the optical path of the optical system 100. For purposes of this disclosure, an anamorphic element is one which has a different optical power in each of two orthogonal axes (e.g. x and y).

The anamorphic element 130 preferably comprises three component groups, i.e. a positive focusing group 131, a negative focusing group 132, and a negative image expanding group 133. Within each of these three component groups, there is at least one cylindrical or bi-laterally symmetrical element which has an aspherical surface. Each individual component group may optionally also include elements which have rotationally symmetric surfaces that are either spherical or aspherical. The individual component groups may each alternatively be tilted or de-centered with respect to the central longitudinal optical axis 101 (FIG. 4) of the optical system 100 dependent on the amount or type of correction desired. These adjustments to the individual component groups (i.e. tilting and de-centering) may be determined through routine experimentation and may therefore become apparent to the skilled artisan in light of the present disclosure. Each individual component group may be arranged or adjusted independently from the other remaining elements of the optical system 100 (including the remaining individual component groups within the anamorphic element 130). For example, the arrangement or adjustment may require the negative focusing group 132 to have a positive tilt with respect to the central longitudinal optical axis 101 of the optical system 100, while the positive focusing group 131 and negative image expanding group 133 each have a negative tilt with respect to the central longitudinal optical axis 101 of the optical system 100. Other configurations will, or course, fall within the scope of the present invention in light of this description. Alternatively, exactly three component groups (within the anamorphic element 130) may not be required in all configurations. Although, ideally, each of the three component groups within the anamorphic element 130 effects a tilt on the image of the object, all that may be required is that the overall tilt effect be a certain value and this may be accomplished with fewer or greater component groups within the anamorphic element 130. The exact number of component groups within the anamorphic element 130 may be dependent on the overall configuration of the optical system (including the above-mentioned tilting), the value for incident angle θ, and the image quality desired.

The telecentric element 140 in the optical system 100 is used mainly to reduce or eliminate the trapezoidal image distortion (otherwise known as "keystone-type" distortion) of the image that often occurs in an imaging system that has an incident angle θ greater than zero. This prevention of trapezoidal image distortion is desired in the optical system of the various embodiments of the present invention throughout this disclosure. Telecentricity may be introduced into these optical systems through a combination of factors which include a focusing surface, some or all of the elements of the remaining portion of the optical system, and the relative spacing/positioning of each of these elements. As such, throughout this disclosure, the phrase "telecentric element" may represent a combination of elements and/or corresponding spacing/positioning of these elements that when used cause the system to image in a telecentric manner. Also, if desired, the telecentric element 140 may optionally-be used to introduce a tilt on the image of the object (as mentioned above) and may also optionally be used to focus the image. The telecentric element 140 is preferably positioned subsequent the anamorphic element 130 and imaging element 120 within the optical path of the optical system 100 and may comprise a lens, mirror, lens/mirror combination, or other types as discussed below. As mentioned above, it may be desirable to provide the telecentric element 140 as a mirror as illustrated in FIG. 6 to effect a fold in the optical path of the optical system 100 to thereby reduce the overall depth D of the housing 14 (FIGS. 1–3) containing the optical panel 10 and optical system 100.

For purposes of this disclosure, a telecentric element is one which causes light rays to become substantially parallel. In other words, light that reflects off a telecentric mirror element, or emerges from a telecentric lens element does not further separate (is not conical in shape) and thus, results in the object appearing to come from an infinite distance.

It may be desirable to tilt and de-center the telecentric element 140 with respect to the central longitudinal optical axis 101 of the optical system 100 dependent on the amount or type of correction desired. These adjustments to the telecentric element 140 (i.e. tilting and de-centering) may be determined through routine experimentation and may therefore become apparent to the skilled artisan in light of the present disclosure. In the preferred embodiment, the telecentric element 140 may comprise a non-rotationally symmetric surface which is toroidal and/or aspherical in order to improve the quality of the image.

As an alternative to providing the telecentric element 140 as a lens, mirror, or lens/mirror combination as explained above, the reduction or elimination of the keystone-type distortion may be performed electronically. For example, image source 110 may be a DMD configured to produce an image having an "inverse keystone-type distortion" which compensates for the keystone-type distortion caused by the optics of the projection path. Of course, this distortion correction technique can be used to compensate for any other distortion correction or focusing elements provided in the optical system. Although this technique has been described with reference to a DMD modulator, other modulators such as an LCD may be used.

FIG. 5 is a side view cross sectional schematic of an ultrathin optical panel 10 using a preferred optical system 100 of the type shown in FIG. 4. Commonly available optical design software such as, for example, ZEMAX (Focus Software, Inc.) may be used to assist in describing the various characteristics (e.g. radius, thickness, glass type, diameter, and whether the surface is conic) corresponding to each surface region of each individual elements/groups within the optical system 100. In the exemplary configuration shown in FIG. 4, the ZEMAX software outputs surface data describing these surface characteristics as illustrated in Table 1. The surface data for surfaces #4–#16 (illustrated in the left-hand column of Table 1) correspond to the imaging element 120. The surface data for surfaces #19–#26, #29–#31, and #35–#39 correspond to the positive focusing group 131, a negative focusing group 132, and a negative image expanding group 133, respectively, within the anamorphic element 130. The surface data for surface #43 correspond to the telecentric element 140.

Of course, other surface data values for each individual element/group will become apparent to those of ordinary skill in the art in light of the present disclosure and may therefore be determined through routine experimentation dependent on the overall configuration and positioning of the individual elements/groups within the optical system 100 (including the above-mentioned tilting), the value for incident angle θ, and the quality of the image desired.

TABLE 1

ZEMAX Software Output Describing Surface Data Summary and Detail for Each Individual Element within the Optical System 100

SURFACE DATA SUMMARY:

| Surf | Type | Radius | Thickness | Glass | Diameter | Conic |
|---|---|---|---|---|---|---|
| OBJ | STANDARD | Infinity | 0 | | 21.756 | 0 |
| 1 | STANDARD | Infinity | 0 | | 21.756 | 0 |
| 2 | COORDBRK | — | 292.175 | — | — | — |
| 3 | COORDBRK | — | −249.4148 | — | — | — |
| 4 | STANDARD | Infinity | 10.69606 | SFL6 | 64.80751 | 0 |
| 5 | STANDARD | −74.6184 | 19.99612 | | 65.37593 | 0 |
| 6 | STANDARD | 228.0807 | 10.34738 | SK5 | 50.95582 | 0 |
| 7 | STANDARD | −55.44567 | 4.999329 | SF2 | 49.81779 | 0 |
| 8 | STANDARD | Infinity | 19.96982 | | 46.37759 | 0 |
| STO | STANDARD | Infinity | 6 | | 35.65802 | 0 |
| 10 | STANDARD | −45.74455 | 15.99918 | SF2 | 37.60689 | 0 |
| 11 | STANDARD | Infinity | 3.357388 | | 56.80725 | 0 |
| 12 | STANDARD | −184.6081 | 14.13996 | LAKN22 | 58.86762 | 0 |
| 13 | STANDARD | −42.9287 | 8.995559 | SF1 | 62.42738 | 0 |
| 14 | STANDARD | −66.38955 | 0.5 | | 75.3492 | 0 |
| 15 | STANDARD | Infinity | 15 | SK5 | 88.60007 | 0 |
| 16 | STANDARD | −100.051 | 119.414 | | 91.11639 | 0 |
| 17 | COORDBRK | — | −84.414 | — | — | — |
| 18 | COORDBRK | — | 0 | — | — | — |
| 19 | BICONICX | Infinity | 20 | BK7 | 157.8103 | 0 |
| 20 | IRREGULA | Infinity | −20 | | 152.2011 | 0 |
| 21 | COORDBRK | — | 108.4461 | — | — | — |
| 22 | COORDBRK | — | 0 | — | — | — |
| 23 | IRREGULA | Infinity | 20 | BK7 | 163.0092 | 0 |
| 24 | BICONICX | Infinity | 0 | SAN | 214.3203 | 0 |
| 25 | BICONICX | Infinity | 15 | SFL56 | 214.3203 | 0 |
| 26 | BICONICX | Infinity | −35 | | 227.1676 | 0 |
| 27 | COORDBRK | — | 189.2805 | | | |
| 28 | COORDBRK | — | 0 | | | |
| 29 | BICONICX | Infinity | 20 | BK7 | 181.0634 | 0 |
| 30 | BICONICX | Infinity | 0 | SAN | 201.5716 | 0 |
| 31 | BICONICX | Infinity | 25 | SFL56 | 201.5716 | 0 |
| 32 | BICONICX | Infinity | −45 | | 209.3956 | 0 |
| 33 | COORDBRK | — | 364.5128 | — | — | — |
| 34 | COORDBRK | — | 0 | — | — | — |
| 35 | IRREGULA | −194.006 | 35 | POLYCARB | 288.6875 | 0 |
| 36 | IRREGULA | −194.006 | −35 | | 309.3933 | 0 |
| 37 | COORDBRK | — | 80 | — | — | — |
| 38 | COORDBRK | — | 0 | — | — | — |
| 39 | BICONICX | Infinity | 30 | ACRYLIC | 306.0721 | 0 |
| 40 | BICONICX | Infinity | −30 | | 252.3439 | 0 |
| 41 | COORDBRK | — | 850 | — | — | — |
| 42 | COORDBRK | — | 0 | — | — | — |
| 43 | BICONICX | −3722.143 | 0 | MIRROR | 367.4967 | 0 |
| 44 | COORDBRK | — | −35 | — | — | — |
| 45 | COORDBRK | — | −415 | — | — | — |
| 46 | COORDBRK | — | 0 | — | — | — |
| 47 | STANDARD | Infinity | −12.5 | BK7 | 0 | 0 |
| IMA | STANDARD | Infinity | | | 1272.227 | 0 |

SURFACE DATA DETAIL:

Surface OBJ       : STANDARD
Surface 1         : STANDARD
Surface 2         : COORDBRK
Decenter X        :                              0
Decenter Y        :                              0
Tilt About X      :                            −14
Tilt About Y      :                              0
Tilt About Z      :                              0
Order             : Decenter then tilt
Surface 3         : COORDBRK
Decenter X        :                              0
Decenter Y        :                              0
Tilt About X      :                     −3.6145015
Tilt About Y      :                              0
Tilt About Z      :                              0
Order             : Decenter then tilt
Surface 4         : STANDARD
Surface 5         : STANDARD
Surface 6         : STANDARD
Surface 7         : STANDARD
Surface 8         : STANDARD TABLE 1-continued ZEMAX Software Output Describing Surface Data Summary and Detail for Each Individual Element within the Optical System 100

| | | |
|---|---|---|
| Surface STO | : STANDARD | |
| Surface 10 | : STANDARD | |
| Surface 11 | : STANDARD | |
| Surface 12 | : STANDARD | |
| Surface 13 | : STANDARD | |
| Surface 14 | : STANDARD | |
| Surface 15 | : STANDARD | |
| Surface 16 | : STANDARD | |
| Surface 17 | : COORDBRK | |
| Decenter X | : | 0 |
| Decenter Y | : | 0 |
| Tilt About X | : | 3.6145015 |
| Tilt About Y | : | 0 |
| Tilt About Z | : | 0 |
| Order | : Decenter then tilt | |
| Surface 18 | : COORDBRK | |
| Decenter X | : | 0 |
| Decenter Y | : | 0 |
| Tilt About X | : | −33.784948 |
| Tilt About Y | : | 0 |
| Tilt About Z | : | 0 |
| Order | : Tilt then decenter | |
| Surface 19 | : BICONICX | |
| X Radius | : | 173.59718 |
| X Conic | : | 0 |
| Aperture | : Rectangular Aperture | |
| X Half Width | : | 50 |
| Y Half Width | : | 57 |
| Y- Decenter | : | −35 |
| Surface 20 | : IRREGULA | |
| Decenter X | : | 0 |
| Decenter Y | : | 0 |
| Tilt X | : | 0 |
| Tilt Y | : | 0 |
| Spherical | : | 0 |
| Astigmatism | : | 0 |
| Coma | : | 0 |
| Aperture | : Rectangular Aperture | |
| X Half Width | : | 50 |
| Y Half Width | : | 57 |
| Y- Decenter | : | −35 |
| Surface 21 | : COORDBRK | |
| Decenter X | : | 0 |
| Decenter Y | : | 0 |
| Tilt About X | : | 33.784948 |
| Tilt About Y | : | 0 |
| Tilt About Z | : | 0 |
| Order | : Decenter then tilt | |
| Surface 22 | : COORDBRK | |
| Decenter X | : | 0 |
| Decenter Y | : | 0 |
| Tilt About X | : | −37.672381 |
| Tilt About Y | : | 0 |
| Tilt About Z | : | 0 |
| Order | : Tilt then decenter | |
| Surface 23 | : IRREGULA | |
| Decenter X | : | 0 |
| Decenter Y | : | 0 |
| Tilt X | : | 0 |
| Tilt Y | : | 0 |
| Spherical | : | 0 |
| Astigmatism | : | 0 |
| Coma | : | 0 |
| Aperture | : Rectangular Aperture | |
| X Half Width | : | 35 |
| Y Half Width | : | 70 |
| Y- Decenter | : | −48 |
| Surface 24 | : BICONICX | |
| X Radius | : | −218.64119 |
| X Conic | : | 0 |
| Aperture | : Rectangular Aperture | |
| X Half Width | : | 35 |
| Y Half Width | : | 70 |
| Y- Decenter | : | −48 |
| Surface 25 | : BICONICX | |
| X Radius | : | −218.64119 |

TABLE 1-continued

ZEMAX Software Output Describing Surface Data Summary and Detail for Each Individual Element within the Optical System 100

| | | |
|---|---|---|
| X Conic | : | 0 |
| Aperture | : Rectangular Aperture | |
| X Half Width | : | 35 |
| Y Half Width | : | 70 |
| Y- Decenter | : | −48 |
| Surface 26 | : BICONICX | |
| X Radius | : | 173.59718 |
| X Conic | : | 0 |
| Aperture | : Rectangular Aperture | |
| X Half Width | : | 35 |
| Y Half Width | : | 70 |
| Y- Decenter | : | −48 |
| Surface 27 | : COORDBRK | |
| Decenter X | : | 0 |
| Decenter Y | : | 0 |
| Tilt About X | : | 37.672381 |
| Tilt About Y | : | 0 |
| Tilt About Z | : | 0 |
| Order | : Decenter then tilt | |
| Surface 28 | : COORDBRK | |
| Decenter X | : | 0 |
| Decenter Y | : | 0 |
| Tilt About X | : | −19.557286 |
| Tilt About Y | : | 0 |
| Tilt About Z | : | 0 |
| Order | : Decenter then tilt | |
| Surface 29 | : BICONICX | |
| X Radius | : | −97.933517 |
| X Conic | : | 0 |
| Aperture | : Rectangular Aperture | |
| X Half Width | : | 58 |
| Y Half Width | : | 65 |
| Y- Decenter | : | −43 |
| Surface 30 | : BICONICX | |
| X Radius | : | 218.64119 |
| X Conic | : | 0 |
| Aperture | : Rectangular Aperture | |
| X Half Width | : | 58 |
| Y Half Width | : | 65 |
| Y- Decenter | : | −43 |
| Surface 31 | : BICONICX | |
| X Radius | : | 218.64119 |
| X Conic | : | 0 |
| Aperture | : Rectangular Aperture | |
| X Half Width | : | 58 |
| Y Half Width | : | 65 |
| Y- Decenter | : | −43 |
| Surface 32 | : BICONICX | |
| X Radius | : | −218.64119 |
| X Conic | : | 0 |
| Aperture | : Rectangular Aperture | |
| X Half Width | : | 58 |
| Y Half Width | : | 65 |
| Y- Decenter | : | −43 |
| Surface 33 | : COORDBRK | |
| Decenter X | : | 0 |
| Decenter Y | : | 0 |
| Tilt About X | : | 19.557286 |
| Tilt About Y | : | 0 |
| Tilt About Z | : | 0 |
| Order | : Decenter then tilt | |
| Surface 34 | : COORDBRK | |
| Decenter X | : | 0 |
| Decenter Y | : | −53.183452 |
| Tilt About X | : | −2.0483201 |
| Tilt About Y | : | 0 |
| Tilt About Z | : | 0 |
| Order | : Decenter then tilt | |
| Surface 35 | : IRREGULA | |
| Decenter X | : | 0 |
| Decenter Y | : | 0 |
| Tilt X | : | 0 |
| Tilt Y | : | 0 |
| Spherical | : | 0 |
| Astigmatism | : | 0 |
| Coma | : | 0 |

TABLE 1-continued

ZEMAX Software Output Describing Surface Data Summary and Detail for Each Individual Element within the Optical System 100

| | | |
|---|---|---|
| Aperture | : Rectangular Aperture | |
| X Half Width | : | 90 |
| Y Half Width | : | 80 |
| Surface 36 | : IRREGULA | |
| Decenter X | : | 0 |
| Decenter Y | : | 0 |
| Tilt X | : | 4.132604 |
| Tilt Y | : | 0 |
| Spherical | : | 0 |
| Astigmatism | : | 0 |
| Coma | : | 0 |
| Aperture | : Rectangular Aperture | |
| X Half Width | : | 90 |
| Y Half Width | : | 80 |
| Surface 37 | : COORDBRK | |
| Decenter X | : | 0 |
| Decenter Y | : | 53.183452 |
| Tilt About X | : | 2.0483201 |
| Tilt About Y | : | 0 |
| Tilt About Z | : | 0 |
| Order | : Tilt then decenter | |
| Surface 38 | : COORDBRK | |
| Decenter X | : | 0 |
| Decenter Y | : | 0 |
| Tilt About X | : | 11.853793 |
| Tilt About Y | : | 0 |
| Tilt About Z | : | 0 |
| Order | : Decenter then tilt | |
| Surface 39 | : BICONICX | |
| X Radius | : | −108.26109 |
| X Conic | : | −0.43754756 |
| Aperture | : Rectangular Aperture | |
| X Half Width | : | 90 |
| Y Half Width | : | 78 |
| Y- Decenter | : | −63 |
| Surface 40 | : BICONICX | |
| X Radius | : | 0 |
| X Conic | : | 0 |
| Aperture | : Rectangular Aperture | |
| X Half Width | : | 110 |
| Y Half Width | : | 78 |
| Y- Decenter | : | −63 |
| Surface 41 | : COORDBRK | |
| Decenter X | : | 0 |
| Decenter Y | : | 0 |
| Tilt About X | : | −11.853793 |
| Tilt About Y | : | 0 |
| Tilt About Z | : | 0 |
| Order | : Decenter then tilt | |
| Surface 42 | : COORDBRK | |
| Decenter X | : | 0 |
| Decenter Y | : | 0 |
| Tilt About X | : | 6.25 |
| Tilt About Y | : | 0 |
| Tilt About Z | : | 0 |
| Order | : Decenter then tilt | |
| Surface 43 | : BICONICX | |
| X Radius | : | −2108.2232 |
| X Conic | : | 0 |
| Aperture | : Rectangular Aperture | |
| X Half Width | : | 510 |
| Y Half Width | : | 92 |
| V- Decenter | : | −92 |
| Surface 44 | : COORDBRK | |
| Decenter X | : | 0 |
| Decenter Y | : | 0 |
| Tilt About X | : | 0 |
| Tilt About Y | : | 0 |
| Tilt About Z | : | 0 |
| Order | : Decenter then tilt | |
| Surface 45 | : COORDBRK | |
| Decenter X | : | 0 |
| Decenter Y | : | 0 |
| Tilt About X | : | 6.25 |
| Tilt About Y | : | 0 |
| Tilt About Z | : | 0 |

TABLE 1-continued

ZEMAX Software Output Describing Surface Data Summary and Detail for Each Individual Element within the Optical System 100

| | | |
|---|---|---|
| Order | : Decenter then tilt | |
| Surface 46 | : COORDBRK | |
| Decenter X | : | 0 |
| Decenter Y | : | −78.542123 |
| Tilt About X | : | 79 |
| Tilt About Y | : | 0 |
| Tilt About Z | : | 0 |
| Order | : Decenter then tilt | |
| Surface 47 | : STANDARD | |
| Aperture | : Rectangular Aperture | |
| X Half Width | : | 518 |
| Y Half Width | : | 391 |
| Y- Decenter | : | 4 |
| Surface IMA | : STANDARD | |
| Aperture | : Rectangular Aperture | |
| X Half Width | : | 518 |
| Y Half Width | : | 391 |

The optical system 100 as described above produces a properly focused image on the surface of the inlet face 20 of an optical panel 10 and retains the aspect ratio of the original object while maintaining a linear point-to-point mapping of the object to the image.

Instead of comprising lenses, the imaging element 120 and anamorphic element 130 each may alternatively comprise a refractive element, a reflective element (e.g. mirror), a diffractive element, or combinations thereof. The surface shapes may be provided in whole, or in part, by Fresnel steps or facets. It may be desirable to provide the imaging element 120 and/or anamorphic element 130 as a mirror or to provide additional mirror elements to effect a fold or multiple folds in the optical path of the optical system 100 to thereby reduce the overall depth D of the housing 14 (FIGS. 1–3) containing the optical panel 10 and optical system 100. The following embodiments illustrated in FIGS. 7–10 may also incorporate these design alternatives.

The coordinate system used to describe the systems disclosed in FIGS. 7–10 is a right-hand Cartesian coordinate system with the x-axis in the vertical direction, and the y-axis in the horizontal direction. All tilts of each lens group in the system are substantially in the x-z plane. The x-z plane is also considered to be a plane of symmetry for the system. Tilts in this system are considered to be positive if they are in the counter-clockwise direction when the system is viewed such that the positive y direction is pointing up and the positive z direction is pointing to the right. The optical axis of the entire system is defined to be the line that connects the center of the object plane with the center of the image plane. In the case of a folded system (i.e. a system that incorporates at least one reflective surface), the optical axis is correspondingly folded.

Figure 7:
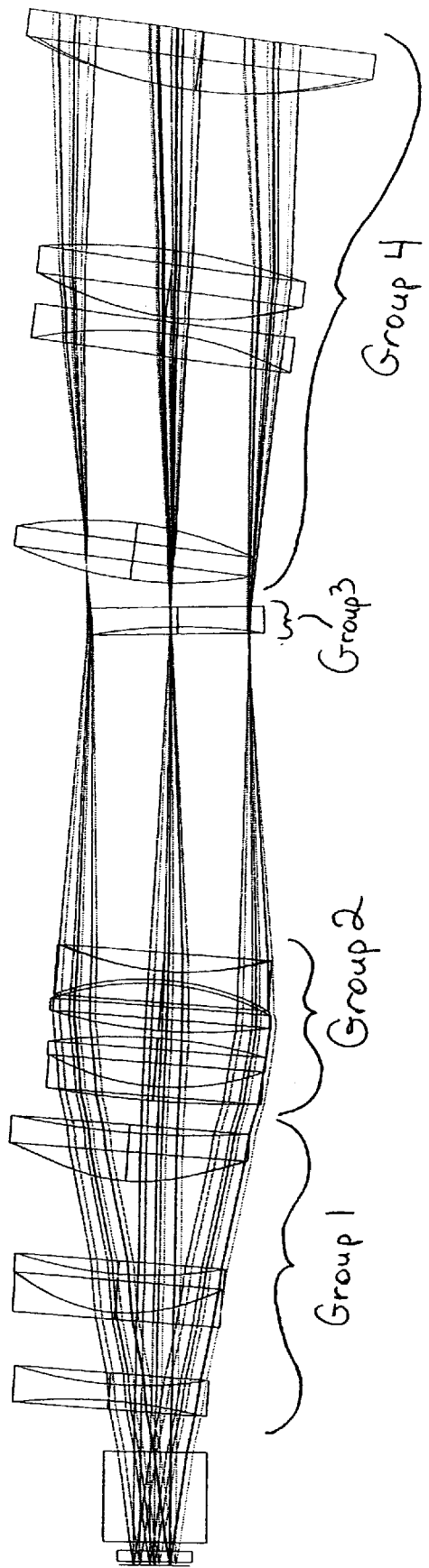
FIG. 7 is a side view cross sectional schematic illustrating an optical system comprising a 4-group lens system, in accordance with another preferred embodiment of the present invention.
Figure 8:
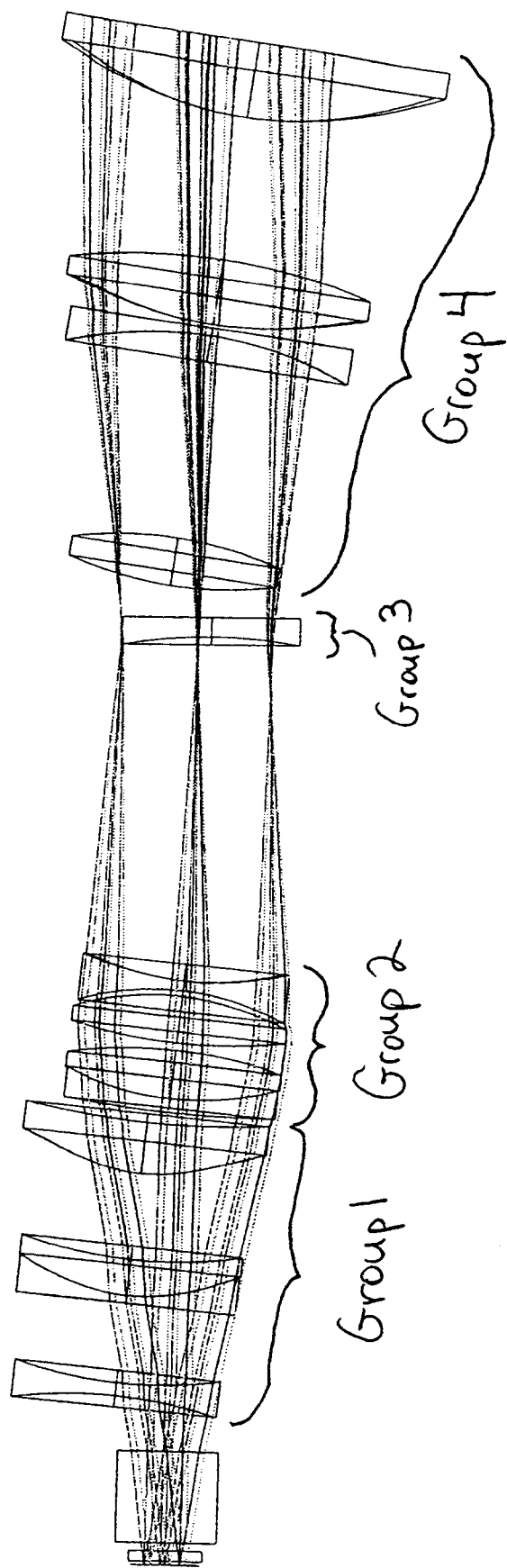
FIG. 8 is a side view cross sectional schematic illustrating an optical system comprising a 4-group lens system used in conjunction with a telecentric reflective element (not shown) whose optical axis is perpendicular to the display image plane, in accordance with another preferred embodiment of the present invention.

The optical system described in this disclosure is derived by considering that a simple conventional system of two crossed cylinders (i.e. cylinders having their major axes perpendicular to each other—see, for example, anamorphic cylindrical lenses $c_h$ and $c_v$ in U.S. Pat. No. 6,012,816 issued to Beiser) can produce an anamorphic distortion-corrected image on a tilted image plane. A system of two crossed cylinders cannot however produce the high quality image that is required for a commercial image projection system. In the present invention, the conventional crossed-cylinder system has been replaced by two substantially cylindrical elements (shown, for example, as lens groups 1 and 4 in each of FIGS. 7 and 8, and as lens groups 1 and 3 in FIG. 10) that are not crossed (i.e. their major axes are not perpendicular to each other) and at least one substantially rotationally symmetric element between the two substantially cylindrical elements. FIGS. 7 and 8 each illustrate lens groups 2 and 3 as substantially rotationally symmetric lens groups. Whereas, in the embodiment shown in FIG. 10, lens group 2 is the sole substantially rotationally symmetric lens group. This configuration of groups allows, inter alia, for the correction of optical aberrations in the system while maintaining the ability to produce an image on a tilted image plane that is corrected for anamorphic distortion.

Systems where the object and image planes are tilted typically suffer from anamorphic distortion which is defined as a ratio of the effective vertical and horizontal magnification that is not equal to one. The effective magnification of a system -with a tilted image plane is defined to be $$m_v \text{eff} = m_v \cos(a)/\cos(c) \tag{$1_v$}$$

$$m_h \text{eff} = m_h \tag{$1_h$}$$

where $m_v$ and $m_h$ are the respective vertical and horizontal magnification of the optical system, and a and c are the respective tilt angles of the object, and-the image plane with respect to the optical axis of the entire system. The effective focal lengths of the conventional system of crossed cylinders is given by the equations, $$EFL_v = OI/(2 + m_v + 1/m_v) \tag{$2_v$}$$

$$EFL_h = OI/(2 + m_h + 1/m_h) \tag{$2_h$}$$

where OI is the object to image distance, and $EFL_v$ and $EFL_h$ are the respective vertical and horizontal effective focal lengths of the vertical and horizontal cylindrical lenses. The tilt angles of the object (a), the horizontally focusing cylinder ($b_h$), the vertically focusing cylinder ($b_v$) and the image plane (c) are related with the equations, $$m_v \tan(a - b_v) = \tan(c - b_v) \tag{$3_v$}$$

$$m_h \tan(a - b_h) = \tan(c - b_h) \tag{$3_h$}$$

The solutions to equations (1–3) yield a system with the first order properties required to create an image on a tilted plane with no anamorphic distortion.

A conventional system of crossed cylinders has the advantage that for a reasonably large OI distance, the tilt angles of the object plane and the cylinders are small. However, the main drawback is that the system cannot operate with high performance at low f/#'s because the overall crossed-cylinder design form is inherently limited in its ability to correct for optical. aberrations that are present.

If we consider the conventional system of crossed cylinders discussed above in more detail we can develop an instructional example which may be used to understand the present invention. We can simplify this conventional system by considering a conventional system with an untilted object-plane (a=0 degrees). The goal of this instructional exemplary system is to produce an image onto a tilted image-plane (c=78 degrees) with no anamorphic distortion. Using the information in Table 2 below, we can solve for the other system parameters to get a first order model of the conventional system.

TABLE 2

Parameters for Convention Two Crossed-Cylinder System

| | Value |
| --- | --- |
| Input Parameter | |
| Object to image distance (OI) | 2 m |
| Object size | 12.7 mm |
| Image size | 1.27 m |
| Object-plane tilt | 0 degrees |
| Image-plane tilt | 78 degrees |
| Calculated Parameter | |
| Horizontal magnification ($m_h$) | −100 |
| Vertical magnification ($m_v$) | −20.8 |
| Effective focal length horizontal ($EFL_h$) | 19.6 mm |
| Effective focal length vertical ($EFL_v$) | 87.6 mm |
| Horizontal focusing lens tilt angle ($b_h$) | 2.25 degrees |
| Vertical focusing lens tilt angle ($b_v$) | 7.65 degrees |

For an f/2.5 system with a 12.7 mm diagonal, both the vertical and the horizontal focusing lenses need to have fields of view of >30 degrees. Cylindrical lenses with small f/#'s and large fields of view are difficult to both design and manufacture.

To overcome the above disadvantages, the conventional system of two crossed cylinders may be replaced by a system of two substantially parallel cylindrical elements and at least one substantially rotationally symmetric element.

We degenerate the two crossed-cylinder system discussed above into a system with three. or more lens groups which allows for the correction of optical aberrations in the system and reduces the required optical power of the individual cylindrical elements in the system. The rotationally symmetric element may be a single lens group or may comprise 2 separate lens groups.

In the system of four groups (see FIGS. 7 and 8), we can reduce the powers and tilt angles of the cylindrical elements from the conventional two crossed-cylinder system by degenerating each of the cylindrical elements into a substantially cylindrical group and a substantially rotationally symmetric group. In this way we can spread out the optical power of the cylindrical elements through the rotationally symmetric elements. To accomplish this, we combined a positively focusing rotationally symmetric group (shown as group 2 in FIG. 7) with a positive horizontally-focusing cylindrical group (group 1). This combination of groups 1 and 2 replaces the horizontally-focusing cylindrical lens of the conventional crossed-cylinder system. We also combined a rotationally symmetric group (group 3) which may be either negatively or positively focusing with a negative horizontally-focusing cylindrical group (group 4). This combination of groups 3 and 4 replaces the vertically-focusing cylindrical lens of the conventional crossed-cylinder system. In these embodiments of the present invention, the optical power of group 3 is substantially equal and opposite in sign to the optical power in the horizontal direction of group 4, and the optical power of the combination of groups 3 and 4 will be positive in the vertical direction and-zero in the horizontal direction. In these embodiments, the combination of group 1 and group 2 will provide substantially all of the optical power in the horizontal direction. The optical power in the vertical direction will be provided substantially entirely by the combination of group 2 and group 3, as group 1 and group 4 have substantially no optical power in the vertical direction. Using this configuration also allows us to increase the negative power in group 4 to thereby allow group, 4 to function as a front negative element of a reverse telephoto lens system in the horizontal direction. This also allows us to increase the focal length of group 4.

Optical systems of the present invention include 2 groups of lenses that are substantially cylindrical. These substantially cylindrical lens groups surround at least one group of lenses that are substantially rotationally symmetric. The optical axis of each of the lens groups is substantially in the x-z plane. The tilts of each of the substantially cylindrical and substantially rotationally symmetric lens groups are substantially in the x-z plane. There are preferably 3 elements (i.e. one in each of groups 1, 2, and 4 in FIGS. 7 and 8, and one in each of groups 1, 2, and 3 in FIG. 10) that are plastic or optical glass and that have substantially cylindrical surfaces on one side and substantially rotationally symmetric aspherical surfaces on the other. The tilts of each group in the system are all relatively small with respect to the central ray of the incident light. The decenters in the system are also small with respect to the central ray of the incident light. The at least one substantially rotationally symmetric group may consist of only one substantially rotationally symmetric group or, more preferably, may comprise at least 2 substantially rotationally symmetric groups. When utilizing 2 or more substantially rotationally symmetric groups, additional improvement in the aberration correcting characteristics of the optical system occurs. Small decenters and tilts are advantageous in that all of the elements in the optical system can be of minimum complexity thereby allowing for ease of manufacturability. We have achieved these advantages-by beginning with a system of crossed cylinders and then moving the majority of the optical power of the system into a substantially rotationally symmetric optical system. We moved substantially all of the power in the vertical direction into the at least one substantially rotationally symmetric system and spread the optical power in the horizontal direction through the two substantially cylindrical groups and the at least one substantially rotationally symmetric group. In this way we are able to achieve a shorter focal length optical system in the horizontal direction and a longer focal length optical system in the vertical direction. The ratio of the optical powers in the vertical and horizontal directions provide the correction mechanism for the anamorphic distortion in the system. Optionally, if we combine this optical system with a substantially telecentric element, then we may also prevent keystone distortion in the system. The telecentric element may be an element which is refractive, diffractive, reflective, or combinations thereof. The telecentric element may be holographic (e.g. such as a volumetric type, surface-relief type, or combination thereof), or may alternatively or additionally include surfaces which are spherical, cylindrical, toric, conic, elliptical or combinations thereof. The surface shape may be provided in whole, or in part, by Fresnel steps or facets. In the embodiment illustrated in FIG. 9, the telecentric element includes a reflective conic surface 240 whose optical axis 291 is perpendicular to the viewing screen.

FIG. 7 Embodiment

In the prescription of the system illustrated in FIG. 7 as described by the Zemax prescription shown in Table 3 below, the, coordinate system has been rotated by 90 degrees about the z-axis. This makes the plane of symmetry the x-z plane. The horizontal axis of this system is the y-axis and the vertical axis is the x-axis.

In this system, there are 4 groups of refractive optics and one reflective surface (not shown). Each group is tilted and decentered with respect to the optical axis of the system. Lenses within a group are aligned along a common axis of that group.

Group 1 in this system has the majority of its optical power in the horizontal direction. This power is provided by 3 cylindrical elements with curvature in the y-direction and one aspheric cylindrical surface, also with power in the horizontal direction. The sign of the optical power of this group is positive. There is also one rotationally symmetric surface within this group, which in this case is aspheric. The cylindrical elements in this group are all made of optical glass. The lens which includes the aspheric rotationally symmetric surface and aspheric cylindrical surface comprises a polymer material.

Group 2 in this system is aligned with its optical axis parallel to Group 1. This is not a requirement for the optimum performance of the system. The optical power of Group 2 is substantially rotationally symmetric. The sign of the optical. power of this group is positive. There are 3 rotationally symmetric spherical elements in this group, one aspheric cylindrical surface with power in the horizontal direction, and one rotationally symmetric aspheric surface. The rotationally symmetric spherical elements in this group are all made of optical glass. The lens which includes the aspheric rotationally symmetric surface and aspheric cylindrical surface comprises a polymer material.

Group 3 in this system is comprised of a single rotationally symmetric glass element with negative power.

Group 4 in this system has the majority of its optical power in the horizontal direction. This power is provided by 3 cylindrical elements with curvature in the y-direction and one aspheric cylindrical surface, also with power in the horizontal direction. The sign of the optical power of this group is negative. There is also one rotationally symmetric surface within this group, which in this case is aspheric. The cylindrical elements,in this group are all made of optical glass. The lens which includes the aspheric rotationally symmetric surface and aspheric cylindrical surface comprises a polymer material.

The reflective surface in this system is a section of a rotationally symmetric spherical surface. This element allows for the prevention of keystone distortion in the system.

The use of optical glass in each of the groups allows for the correction of chromatic aberrations within each group. The use of two groups that have the majority of their powers in the horizontal direction (and are therefore anamorphic) allows for the correction of anamorphic distortion in the system by expanding the image in the horizontal direction.

Of course, with respect to the Zemax prescription shown in Table 3 below, other surface data values for each individual element/group will become apparent to those of ordinary skill in the art in light of the present disclosure and may therefore be determined through routine experimentation dependent on the overall configuration and positioning of the individual elements/groups within the optical system (including the above-mentioned tilting), the value for incident angle θ, and the quality of the image desired.

TABLE 3

ZEMAX Software Output Describing Surface Data Summary and Detail for Each Individual Element within the Optical System shown in FIG. 7

SURFACE DATA SUMMARY:

| Surf | Type | Radius | Thickness | Glass | Diameter | Conic |
|------|------|--------|-----------|-------|----------|-------|
| OBJ | STANDARD | Infinity | 8000 | | 17.828 | 0 |
| STO | STANDARD | Infinity | −8000 | | 3265.986 | 0 |
| 2 | STANDARD | Infinity | 0.864763 | | 17.828 | 0 |
| 3 | STANDARD | Infinity | 2.851319 | PK2 | 18.17911 | 0 |
| 4 | STANDARD | Infinity | 2.189276 | | 18.93415 | 0 |
| 5 | STANDARD | Infinity | 23.4 | BK7 | 19.82304 | 0 |
| 6 | STANDARD | Infinity | 0 | | 26.02538 | 0 |
| 7 | STANDARD | Infinity | 27.87508 | | 26.02538 | 0 |
| 8 | COORDBRK | — | 0 | | — | — |
| 9 | COORDBRK | — | 0 | | — | — |
| 10 | TOROIDAL | 129.6164 | 9.3 | LAKN13 | 48.52967 | 0 |
| 11 | TOROIDAL | −108.2366 | 13.75971 | | 49.43559 | 0 |
| 12 | TOROIDAL | Infinity | 10 | BAF52 | 51.38683 | 0 |
| 13 | TOROIDAL | −46.38304 | 5 | SFL6 | 52.72604 | 0 |
| 14 | TOROIDAL | −108.2366 | 28.101 | | 53.43385 | 0 |
| 15 | TOROIDAL | −84.06525 | 5 | POLYCARB | 59.47696 | 0 |
| 16 | EVENASPH | 204.156 | 8.658675 | | 60.58623 | 0 |
| 17 | COORDBRK | — | 0 | | — | — |
| 18 | STANDARD | 303.199 | 3.7 | BASF64A | 53.40982 | 0 |
| 19 | STANDARD | 67.37404 | 12.5 | SK51 | 54.67247 | 0 |
| 20 | STANDARD | −126.7911 | 2 | | 55.42417 | 0 |
| 21 | STANDARD | 138.3907 | 12 | SK51 | 55.89383 | 0 |
| 22 | STANDARD | −67.37404 | 1.094388 | | 55.51275 | 0 |
| 23 | EVENASPH | −66.12222 | 7 | ACRYLIC | 54.54357 | 0 |
| 24 | TOROIDAL | −74.05389 | −38.29439 | | 52.05272 | 0 |
| 25 | COORDBRK | — | −79.81939 | | — | — |

TABLE 3-continued

ZEMAX Software Output Describing Surface Data Summary and Detail for Each Individual Element within the Optical System shown in FIG. 7

| | | | | | | |
|---|---|---|---|---|---|---|
| 26 | COORDBRK | — | 141.1333 | | — | — |
| 27 | COORDBRK | — | 61.53086 | | — | — |
| 28 | STANDARD | −137.3408 | 5 | FN11 | 44.21942 | 0 |
| 29 | STANDARD | Infinity | 12 | | 44.31074 | 0 |
| 30 | COORDBRK | — | 0 | | — | — |
| 31 | TOROIDAL | −99.81465 | 5 | BK7 | 61.34477 | 0 |
| 32 | TOROIDAL | 99.81465 | 48.47432 | | 61.16054 | 0 |
| 33 | TOROIDAL | 99.81465 | 9 | SF8 | 67.03667 | 0 |
| 34 | STANDARD | Infinity | 8 | | 66.96835 | 0 |
| 35 | TOROIDAL | −87.5963 | 10 | ACRYLIC | 66.88644 | 0 |
| 36 | EVENASPH | −170.3467 | 50.02379 | | 68.5112 | 0 |
| 37 | TOROIDAL | −104.4104 | 7 | BK7 | 83.93802 | 0 |
| 38 | TOROIDAL | Infinity | −137.4981 | | 88.90449 | 0 |
| 39 | COORDBRK | — | −78.53086 | | — | — |
| 40 | COORDBRK | — | 0 | | — | — |
| 41 | COORDBRK | — | 0 | | — | — |
| 42 | STANDARD | Infinity | 2000 | | 75.49083 | 0 |
| 43 | STANDARD | Infinity | 0 | | 1042.588 | 0 |
| 44 | COORDBRK | — | 0 | | — | — |
| 45 | STANDARD | −4051.146 | 0 | MIRROR | 1028.374 | 0 |
| 46 | COORDBRK | — | −430 | | — | — |
| 47 | COORDBRK | — | −92 | | — | — |
| 48 | COORDBRK | — | 0 | | — | — |
| IMA | STANDARD | Infinity | | | 1278.152 | 0 |

SURFACE DATA DETAIL:

| | |
|---|---|
| Surface OBJ | : STANDARD |
| Surface STO | : STANDARD |
| Surface 2 | : STANDARD |
| Surface 3 | : STANDARD |
| Surface 4 | : STANDARD |
| Surface 5 | : STANDARD |
| Surface 6 | : STANDARD |
| Surface 7 | : STANDARD |
| Surface 8 | : COORDBRK |
| Decenter X | : 155.59096 |
| Decenter Y | : 0 |
| Tilt About X | : 0 |
| Tilt About Y | : −6.8063628 |
| Tilt About Z | : 0 |
| Order | : Decenter then tilt |
| Surface 9 | : COORDBRK |
| Decenter X | : −144.56097 |
| Decenter Y | : 0 |
| Tilt About X | : 0 |
| Tilt About Y | : 3.0961538 |
| Tilt About Z | : 0 |
| Order | : Decenter then tilt |
| Surface 10 | : TOROIDAL |
| Rad of rev. | : 0 |
| Coeff on $y^2$ | : 0 |
| Coeff on $y^4$ | : 0 |
| Coeff on $y^6$ | : 0 |
| Coeff on $y^8$ | : 0 |
| Coeff on $y^{10}$ | : 0 |
| Coeff on $y^{12}$ | : 0 |
| Coeff on $y^{14}$ | : 0 |
| Surface 11 | : TOROIDAL |
| Rad of rev. | : 0 |
| Coeff on $y^2$ | : 0 |
| Coeff on $y^4$ | : 0 |
| Coeff on $y^6$ | : 0 |
| Coeff on $y^8$ | : 0 |
| Coeff on $y^{10}$ | : 0 |
| Coeff on $y^{12}$ | : 0 |
| Coeff on $y^{14}$ | : 0 |
| Surface 12 | : TOROIDAL |
| Rad of rev. | : 0 |
| Coeff on $y^2$ | : 0 |
| Coeff on $y^4$ | : 0 |
| Coeff on $y^6$ | : 0 |
| Coeff on $y^8$ | : 0 |
| Coeff on $y^{10}$ | : 0 |
| Coeff on $y^{12}$ | : 0 |
| Coeff on $y^{14}$ | : 0 |
| Surface 13 | : TOROIDAL |

TABLE 3-continued

ZEMAX Software Output Describing Surface Data Summary and Detail for Each Individual Element within the Optical System shown in FIG. 7

| | | |
|---|---|---|
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 14 | : TOROIDAL | |
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 15 | : TOROIDAL | |
| Rad of rev. | : | 0 |
| Coeff on y^2 | : | 0 |
| Coeff on y^4 | : | −2.0273396e − 006 |
| Coeff on y^6 | : | −5.3753214e − 010 |
| Coeff on y^8 | : | −1.504234e − 013 |
| Coeff on y^10 | : | 0 |
| Coeff on y^12 | : | 0 |
| Coeff on y^14 | : | 0 |
| Surface 16 | : EVENASPH | |
| Coeff on r 2 | : | 0 |
| Coeff on r 4 | : | −3.0331873e − 007 |
| Coeff on r 6 | : | 9.2407151e − 012 |
| Coeff on r 8 | : | 1.0284025e − 014 |
| Coeff on r 10 | : | 0 |
| Coeff on r 12 | : | 0 |
| Coeff on r 14 | : | 0 |
| Coeff on r 16 | : | 0 |
| Surface 17 | : COORDBRK | |
| Decenter X | : | −5.3006244 |
| Decenter Y | : | 0 |
| Tilt About X | : | 0 |
| Tilt About Y | : | 0 |
| Tilt About Z | : | 0 |
| Order | : Decenter then tilt | |
| Surface 18 | : STANDARD | |
| Surface 19 | : STANDARD | |
| Surface 20 | : STANDARD | |
| Surface 21 | : STANDARD | |
| Surface 22 | : STANDARD | |
| Surface 23 | : EVENASPH | |
| Coeff on r 2 | : | 0 |
| Coeff on r 4 | : | −2.6303085e − 007 |
| Coeff on r 6 | : | 1.8570831e − 011 |
| Coeff on r 8 | : | 1.5979891e − 014 |
| Coeff on r 10 | : | 0 |
| Coeff on r 12 | : | 0 |
| Coeff on r 14 | : | 0 |
| Coeff on r 16 | : | 0 |
| Surface 24 | : TOROIDAL | |
| Rad of rev. | : | 0 |
| Coeff on y^2 | : | 0 |
| Coeff on y^4 | : | −2.3975623e − 008 |
| Coeff on y^6 | : | 6.8814764e − 010 |
| Coeff on y^8 | : | −1.0830506e − 012 |
| Coeff on y^10 | : | 0 |
| Coeff on y^12 | : | 0 |
| Coeff on y^14 | : | 0 |
| Surface 25 | : COORDBRK | |
| Decenter X | : | 5.3006244 |
| Decenter Y | : | 0 |
| Tilt About X | : | 0 |
| Tilt About Y | : | 0 |
| Tilt About Z | : | 0 |
| Order | : Tilt then decenter | |
| Surface 26 | : COORDBRK | |
| Decenter X | : | 144.56097 |
| Decenter Y | : | 0 |
| Tilt About X | : | 0 |

TABLE 3-continued

ZEMAX Software Output Describing Surface Data Summary and Detail for Each Individual Element within the Optical System shown in FIG. 7

| | | |
|---|---|---|
| Tilt About Y | : | −3.0961538 |
| Tilt About Z | : | 0 |
| Order | : Tilt then decenter | |
| Surface 27 | : COORDBRK | |
| Decenter X | : | −144.89968 |
| Decenter Y | : | 0 |
| Tilt About X | : | 0 |
| Tilt About Y | : | 8.3526677 |
| Tilt About Z | : | 0 |
| Order | : Decenter then tilt | |
| Surface 28 | : STANDARD | |
| Surface 29 | : STANDARD | |
| Surface 30 | : COORDBRK | |
| Decenter X | : | 11.137328 |
| Decenter Y | : | 0 |
| Tilt About X | : | 0 |
| Tilt About Y | : | −8.3407325 |
| Tilt About Z | : | 0 |
| Order | : Decenter then tilt | |
| Surface 31 | : TOROIDAL | |
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 32 | : TOROIDAL | |
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 33 | : TOROIDAL | |
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 34 | : STANDARD | |
| Surface 35 | : TOROIDAL | |
| Rad of rev. | : | 0 |
| Coeff on y^2 | : | 0 |
| Coeff on y^4 | : | −1.5370832e − 007 |
| Coeff on y^6 | : | 4.8040392e − 011 |
| Coeff on y^8 | : | −2.0684246e − 014 |
| Coeff on y^10 | : | 0 |
| Coeff on y^12 | : | 0 |
| Coeff on y^14 | : | 0 |
| Surface 36 | : EVENASPH | |
| Coeff on r 2 | : | 0 |
| Coeff on r 4 | : | 3.6651837e − 008 |
| Coeff on r 6 | : | 6.1542825e − 012 |
| Coeff on r 8 | : | −1.0908693e − 015 |
| Coeff on r 10 | : | 0 |
| Coeff on r 12 | : | 0 |
| Coeff on r 14 | : | 0 |
| Coeff on r 16 | : | 0 |
| Surface 37 | : TOROIDAL | |
| Rad of rev. | : | 0 |
| Coeff on y^2 | : | 0 |
| Coeff on y^4 | : | 0 |
| coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 38 | : TOROIDAL | |
| Rad of rev. | : | 0 |

TABLE 3-continued

ZEMAX Software Output Describing Surface Data Summary and Detail for Each Individual Element within the Optical System shown in FIG. 7

| | | |
|---|---|---|
| Coeff on y ^2 | : | 0 |
| Coeff on y ^4 | : | 0 |
| Coeff on y ^6 | : | 0 |
| Coeff on y ^8 | : | 0 |
| Coeff on y ^10 | : | 0 |
| Coeff on y ^12 | : | 0 |
| Coeff on y ^14 | : | 0 |
| Surface 39 | : COORDBRK | |
| Decenter X | : | −11.137328 |
| Decenter Y | : | 0 |
| Tilt About X | : | 0 |
| Tilt About Y | : | 8.3407325 |
| Tilt About Z | : | 0 |
| Order | : Tilt then decenter | |
| Surface 40 | : COORDBRK | |
| Decenter X | : | 144.89968 |
| Decenter Y | : | 0 |
| Tilt About X | : | 0 |
| Tilt About Y | : | −8.3526677 |
| Tilt About Z | : | 0 |
| Order | : Tilt then decenter | |
| Surface 41 | : COORDBRK | |
| Decenter X | : | −143.98834 |
| Decenter Y | : | 0 |
| Tilt About X | : | 0 |
| Tilt About Y | : | 7.4668853 |
| Tilt About Z | : | 0 |
| Order | : Decenter then tilt | |
| Surface 42 | : STANDARD | |
| Surface 43 | : STANDARD | |
| Surface 44 | : COORDBRK | |
| Decenter X | : | 0 |
| Decenter Y | : | 0 |
| Tilt About X | : | 0 |
| Tilt About Y | : | −6 |
| Tilt About Z | : | 0 |
| Order | : Decenter then tilt | |
| Surface 45 | : STANDARD | |
| Surface 46 | : COORDBRK | |
| Decenter X | : | 0 |
| Decenter Y | : | 0 |
| Tilt About X | : | 0 |
| Tilt About Y | : | 6 |
| Tilt About Z | : | 0 |
| Order | : Tilt then decenter | |
| Surface 47 | : COORDBRK | |
| Decenter X | : | 0 |
| Decenter Y | : | 0 |
| Tilt About X | : | 0 |
| Tilt About Y | : | −90 |
| Tilt About Z | : | 0 |
| Order | : Decenter then tilt | |
| Surface 48 | : COORDBRK | |
| Decenter X | : | −2.3476852 |
| Decenter Y | : | 0 |
| Tilt About X | : | 0 |
| Tilt About Y | : | 0 |
| Tilt About Z | : | 0 |
| Order | : Decenter then tilt | |
| Surface IMA | : STANDARD | |

Figure 9:
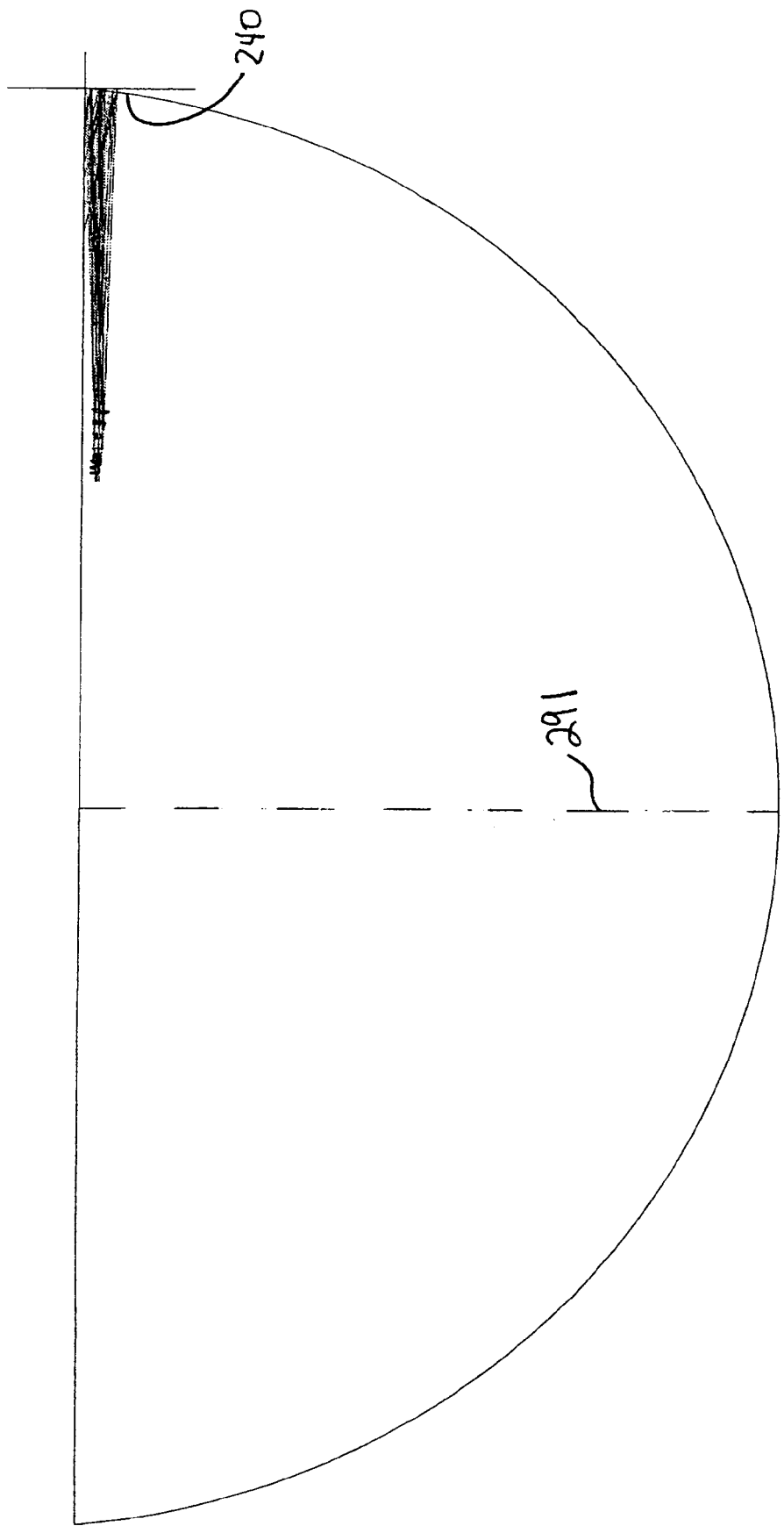
FIG. 9 is a side view cross sectional schematic of the optical system shown in FIG. 8 illustrating the optical system comprising a 4-group lens system and a telecentric reflective element whose optical axis is perpendicular to the display image plane.

FIGS. 8 and 9 Embodiment

In the prescription of the system illustrated in FIGS. 8 and 9 as described by the Zemax prescription shown in Table 4 below, the coordinate system has been rotated by 90 degrees about the z-axis. This makes the plane of symmetry the x-z plane. The horizontal axis of this system is the y-axis and the vertical axis is the x-axis.

In this system, there are 4 groups of refractive optics and one reflective surface (element 240 shown in FIG. 9). Each group is tilted and decentered with respect to the optical axis of the system. Lenses within a group are aligned along a common axis of that group.

Group 1 in this system has the majority of its optical power in the horizontal direction. This power is provided by 3 cylindrical elements with curvature in the y-direction and one aspheric cylindrical surface, also with power in the horizontal direction. The sign of the optical power of this group is positive. There is also one rotationally symmetric surface within this group, which in this case is aspheric. The cylindrical elements in this group are all made of optical glass. The lens which includes the aspheric rotationally. symmetric surface and aspheric cylindrical surface comprises a polymer material.

Group 2 in this system is aligned with its optical axis parallel to Group 1. This is not a requirement for the optimum performance of the system. The optical power of Group 2 is substantially rotationally symmetric. The sign of the optical power of this group is positive. There are 3 rotationally symmetric spherical elements in this group, one aspheric cylindrical surface with power in the horizontal direction, and one rotationally symmetric aspheric surface. The rotationally symmetric spherical elements in this group are all made of optical glass. The lens which includes the aspheric rotationally symmetric surface and aspheric cylindrical surface comprises a polymer material.

Group 3 in this system is comprised of a single rotationally symmetric glass element with negative power.

Group 4 in this system has the majority of its optical power in the horizontal direction. This power is provided by 3 cylindrical elements with curvature in the y-direction and one aspheric cylindrical surface, also with power in the horizontal direction. The sign of the optical power of this group is negative. There is also one rotationally symmetric surface within this group, which in this case is aspheric. The cylindrical elements in this group are all made of optical glass. The lens which includes the aspheric rotationally symmetric surface and aspheric cylindrical surface comprises a polymer material.

The reflective surface 240 in this system is a section of a rotationally symmetric elliptical surface. The optical axis 291 of the reflective surface 240 is aligned to be perpendicular to the surface of the screen. The reflective element allows for the prevention of keystone distortion in the system.

The use of optical glass in each of the groups allows for the correction of chromatic aberrations within each group. The use of two groups that have the majority of their powers in the horizontal direction (and are therefore anamorphic) allows for the correction of anamorphic distortion in the system by expanding the image in the horizontal direction.

Of course, with respect to the Zemax prescription shown in Table 4 below, other surface data values for each individual element/group will become apparent to those of ordinary skill in the art in light of the present disclosure and may therefore be determined through routine experimentation dependent on the overall configuration and positioning of the individual elements/groups within the optical system (including the above-mentioned tilting), the value for incident angle θ, and the quality of the image desired.

TABLE 4

ZEMAX Software Output Describing Surface Data Summary and Detail for Each Individual Element within the Optical System shown in FIGS. 8 and 9

SURFACE DATA SUMMARY:

| Surf | Type | Radius | Thickness | Glass | Diameter | Conic |
|---|---|---|---|---|---|---|
| OBJ | STANDARD | Infinity | 8000 | | 17.828 | 0 |
| STO | STANDARD | Infinity | −8000 | | 3265.986 | 0 |
| 2 | STANDARD | Infinity | 0.864763 | | 17.828 | 0 |
| 3 | STANDARD | Infinity | 2.851319 | PK2 | 18.17911 | 0 |
| 4 | STANDARD | Infinity | 2.189276 | | 18.93415 | 0 |
| 5 | STANDARD | Infinity | 23.4 | BK7 | 19.82304 | 0 |
| 6 | STANDARD | Infinity | 0 | | 26.02539 | 0 |
| 7 | STANDARD | Infinity | 28.14844 | | 26.02539 | 0 |
| 8 | COORDBRK | — | 0 | | — | — |
| 9 | COORDBRK | — | 0 | | — | — |
| 10 | TOROIDAL | 115.6217 | 9.3 | LAKN13 | 52.49747 | 0 |
| 11 | TOROIDAL | −117.9987 | 17.45293 | | 53.15891 | 0 |
| 12 | TOROIDAL | Infinity | 10 | BAF52 | 55.57972 | 0 |
| 13 | TOROIDAL | −54.31997 | 5 | SFL6 | 56.67006 | 0 |
| 14 | TOROIDAL | −117.9987 | 27.50523 | | 57.23669 | 0 |
| 15 | TOROIDAL | −85.44358 | 5 | POLYCARB | 61.96212 | 0 |
| 16 | EVENASPH | 190.3833 | 3.255639 | | 62.90736 | 0 |
| 17 | COORDBRK | — | 0 | | — | — |
| 18 | STANDARD | 295.8531 | 3.7 | BASF64A | 53.60994 | 0 |
| 19 | STANDARD | 74.27916 | 12.5 | SK51 | 54.64766 | 0 |
| 20 | STANDARD | −116.9595 | 2 | | 55.37445 | 0 |
| 21 | STANDARD | 130.9586 | 12 | SK51 | 55.35352 | 0 |
| 22 | STANDARD | −74.27916 | 1.438708 | | 54.72058 | 0 |
| 23 | EVENASPH | −73.29544 | 7 | ACRYLIC | 53.36744 | 0 |
| 24 | TOROIDAL | −73.41695 | −38.63871 | | 50.51813 | 0 |
| 25 | COORDBRK | — | −77.5138 | | — | — |
| 26 | COORDBRK | — | 141.1333 | | — | — |
| 27 | COORDBRK | — | 61.15416 | | — | — |
| 28 | STANDARD | −120.9279 | 5 | SF2 | 45.25703 | 0 |
| 29 | STANDARD | Infinity | 12 | | 45.67146 | 0 |
| 30 | COORDBRK | — | 0 | | — | — |
| 31 | TOROIDAL | −99.3606 | 5 | BK7 | 54.05434 | 0 |
| 32 | TOROIDAL | 99.3606 | 48.74116 | | 53.74465 | 0 |
| 33 | TOROIDAL | 99.3606 | 9 | SF8 | 72.58845 | 0 |
| 34 | STANDARD | Infinity | 8 | | 73.47629 | 0 |
| 35 | TOROIDAL | −109.6959 | 10 | ACRYLIC | 74.80036 | 0 |
| 36 | EVENASPH | −151.3069 | 50.01248 | | 78.32902 | 0 |
| 37 | TOROIDAL | −93.55982 | 7 | BK7 | 94.8463 | 0 |
| 38 | TOROIDAL | Infinity | −137.7536 | | 100.2973 | 0 |
| 39 | COORDBRK | — | −78.15416 | | — | — |
| 40 | COORDBRK | — | 0 | | — | — |
| 41 | COORDBRK | — | 0 | | — | — |

TABLE 4-continued

ZEMAX Software Output Describing Surface Data Summary and Detail for Each Individual Element within the Optical System shown in FIGS. 8 and 9

| | | | | | | |
|---|---|---|---|---|---|---|
| 42 | STANDARD | Infinity | 2008.563 | | 72.85655 | 0 |
| 43 | STANDARD | Infinity | 0 | | 1052.436 | 0 |
| 44 | COORDBRK | — | 0 | | — | — |
| 45 | COORDBRK | — | 0 | | — | — |
| 46 | SUPERCON | −3759.025 | 0 | MIRROR | 8023.895 | −0.13 |
| 47 | COORDBRK | — | 0 | | — | — |
| 48 | COORDBRK | — | −430 | | — | — |
| 49 | COORDBRK | — | −92 | | — | — |
| 50 | COORDBRK | — | 0 | | — | — |
| IMA | STANDARD | Infinity | | | 1279.869 | 0 |

SURFACE DATA DETAIL:

| | |
|---|---|
| Surface OBJ | : STANDARD |
| Surface STO | : STANDARD |
| Surface 2 | : STANDARD |
| Surface 3 | : STANDARD |
| Surface 4 | : STANDARD |
| Surface 5 | : STANDARD |
| Surface 6 | : STANDARD |
| Surface 7 | : STANDARD |
| Surface 8 | : COORDBRK |
| Decenter X | : 143.80997 |
| Decenter Y | : 0 |
| Tilt About X | : 0 |
| Tilt About Y | : −7.4345891 |
| Tilt About Z | : 0 |
| Order | : Decenter then tilt |
| Surface 9 | : COORDBRK |
| Decenter X | : −130.60882 |
| Decenter Y | : 0 |
| Tilt About X | : 0 |
| Tilt About Y | : 2.4389576 |
| Tilt About Z | : 0 |
| Order | : Decenter then tilt |
| Surface 10 | : TOROIDAL |
| Rad of rev. | : 0 |
| Coeff on $y^2$ | : 0 |
| Coeff on $y^4$ | : 0 |
| Coeff on $y^6$ | : 0 |
| Coeff on $y^8$ | : 0 |
| Coeff on $y^{10}$ | : 0 |
| Coeff on $y^{12}$ | : 0 |
| Coeff on $y^{14}$ | : 0 |
| Surface 11 | : TOROIDAL |
| Rad of rev. | : 0 |
| Coeff on $y^2$ | : 0 |
| Coeff on $y^4$ | : 0 |
| Coeff on $y^6$ | : 0 |
| Coeff on $y^8$ | : 0 |
| Coeff on $y^{10}$ | : 0 |
| Coeff on $y^{12}$ | : 0 |
| Coeff on $y^{14}$ | : 0 |
| Surface 12 | : TOROIDAL |
| Rad of rev. | : 0 |
| Coeff on $y^2$ | : 0 |
| Coeff on $y^4$ | : 0 |
| Coeff on $y^6$ | : 0 |
| Coeff on $y^8$ | : 0 |
| Coeff on $y^{10}$ | : 0 |
| Coeff on $y^{12}$ | : 0 |
| Coeff on $y^{14}$ | : 0 |
| Surface 13 | : TOROIDAL |
| Rad of rev. | : 0 |
| Coeff on $y^2$ | : 0 |
| Coeff on $y^4$ | : 0 |
| Coeff on $y^6$ | : 0 |
| Coeff on $y^8$ | : 0 |
| Coeff on $y^{10}$ | : 0 |
| Coeff on $y^{12}$ | : 0 |
| Coeff on $y^{14}$ | : 0 |
| Surface 14 | : TOROIDAL |
| Rad of rev. | : 0 |
| Coeff on $y^2$ | : 0 |
| Coeff on $y^4$ | : 0 |
| Coeff on $y^6$ | : 0 |
| Coeff on $y^8$ | : 0 |

TABLE 4-continued

ZEMAX Software Output Describing Surface Data Summary and Detail for Each Individual Element within the Optical System shown in FIGS. 8 and 9

| | | |
|---|---|---|
| Coeff on y ^10 | : | 0 |
| Coeff on y ^12 | : | 0 |
| Coeff on y ^14 | : | 0 |
| Surface 15 | : TOROIDAL | |
| Rad of rev. | : | 0 |
| Coeff on y ^2 | : | 0 |
| Coeff on y ^4 | : | −2.1611977e − 006 |
| Coeff on y ^6 | : | −4.5580872e − 010 |
| Coeff on y ^8 | : | −4.6863573e − 013 |
| Coeff on y ^10 | : | 0 |
| Coeff on y ^12 | : | 0 |
| Coeff on y ^14 | : | 0 |
| Surface 16 | : EVENASPH | |
| Coeff on r 2 | : | 0 |
| Coeff on r 4 | : | −2.869802e − 007 |
| Coeff on r 6 | : | 6.425773e − 012 |
| Coeff on r 8 | : | 9.676512e − 015 |
| Coeff on r 10 | : | 0 |
| Coeff on r 12 | : | 0 |
| Coeff on r 14 | : | 0 |
| Coeff on r 16 | : | 0 |
| Surface 17 | : COORDBRK | |
| Decenter X | : | −5.2047371 |
| Decenter Y | : | 0 |
| Tilt About X | : | 0 |
| Tilt About Y | : | 0 |
| Tilt About Z | : | 0 |
| Order | : Decenter then tilt | |
| Surface 18 | : STANDARD | |
| Surface 19 | : STANDARD | |
| Surface 20 | : STANDARD | |
| Surface 21 | : STANDARD | |
| Surface 22 | : STANDARD | |
| Surface 23 | : EVENASPH | |
| Coeff on r 2 | : | 0 |
| Coeff on r 4 | : | −2.7448851e − 007 |
| Coeff on r 6 | : | 6.6155129e − 012 |
| Coeff on r 8 | : | 1.7784282e − 014 |
| Coeff on r 10 | : | 0 |
| Coeff on r 12 | : | 0 |
| Coeff on r 14 | : | 0 |
| Coeff on r 16 | : | 0 |
| Surface 24 | : TOROIDAL | |
| Rad of rev. | : | 0 |
| Coeff on y ^2 | : | 0 |
| Coeff on y ^4 | : | −1.974568e − 007 |
| Coeff on y ^6 | : | 3.0077732e − 010 |
| Coeff on y ^8 | : | −2.9779622e − 013 |
| Coeff on y ^10 | : | 0 |
| Coeff on y ^12 | : | 0 |
| Coeff on y ^14 | : | 0 |
| Surface 25 | : COORDBRK | |
| Decenter X | : | 5.2047371 |
| Decenter Y | : | 0 |
| Tilt About X | : | 0 |
| Tilt About Y | : | 0 |
| Tilt About Z | : | 0 |
| Order | : Tilt then decenter | |
| Surface 26 | : COORDBRK | |
| Decenter X | : | 130.60882 |
| Decenter Y | : | 0 |
| Tilt About X | : | 0 |
| Tilt About Y | : | −2.4389576 |
| Tilt About Z | : | 0 |
| Order | : Tilt then decenter | |
| Surface 27 | : COORDBRK | |
| Decenter X | : | −132.4345 |
| Decenter Y | : | 0 |
| Tilt About X | : | 0 |
| Tilt About Y | : | 8.2455704 |
| Tilt About Z | : | 0 |
| Order | : Decenter then tilt | |
| Surface 28 | : STANDARD | |
| Surface 29 | : STANDARD | |
| Surface 30 | : COORDBRK | |
| Decenter X | : | 10.225125 |

TABLE 4-continued

ZEMAX Software Output Describing Surface Data Summary and Detail for Each Individual Element within the Optical System shown in FIGS. 8 and 9

| | | |
|---|---|---|
| Decenter Y | : | 0 |
| Tilt About X | : | 0 |
| Tilt About Y | : | −8.3784212 |
| Tilt About Z | : | 0 |
| Order | : Decenter then tilt | |
| Surface 31 | : TOROIDAL | |
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 32 | : TOROIDAL | |
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 33 | : TOROIDAL | |
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 34 | : STANDARD | |
| Surface 35 | : TOROIDAL | |
| Rad of rev. | : | 0 |
| Coeff on y^2 | : | 0 |
| Coeff on y^4 | : | −1.3997689e − 007 |
| Coeff on y^6 | : | −1.620854e − 010 |
| Coeff on y^8 | : | 8.9411848e − 014 |
| Coeff on y^10 | : | 0 |
| Coeff on y^12 | : | 0 |
| Coeff on y^14 | : | 0 |
| Surface 36 | : EVENASPH | |
| Coeff on r 2 | : | 0 |
| Coeff on r 4 | : | 4.0234625e − 008 |
| Coeff on r 6 | : | 2.1644509e − 012 |
| Coeff on r 8 | : | 3.7891309e − 016 |
| Coeff on r 10 | : | 0 |
| Coeff on r 12 | : | 0 |
| Coeff on r 14 | : | 0 |
| Coeff on r 16 | : | 0 |
| Surface 37 | : TOROIDAL | |
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 38 | : TOROIDAL | |
| Rad of rev. | : | 0 |
| Coeff on y^2 | : | 0 |
| Coeff on y^4 | : | 0 |
| Coeff on y^6 | : | 0 |
| Coeff on y^8 | : | 0 |
| Coeff on y^10 | : | 0 |
| Coeff on y^12 | : | 0 |
| Coeff on y^14 | : | 0 |
| Surface 39 | : COORDBRK | |
| Decenter X | : | −10.225125 |
| Decenter Y | : | 0 |
| Tilt About X | : | 0 |
| Tilt About Y | : | 8.3784212 |
| Tilt About Z | : | 0 |
| Order | : Tilt then decenter | |

TABLE 4-continued

ZEMAX Software Output Describing Surface Data Summary and Detail for Each Individual Element within the Optical System shown in FIGS. 8 and 9

| | | |
|---|---|---|
| Surface 40 | : COORDBRK | |
| Decenter X | : | 132.4345 |
| Decenter y | : | 0 |
| Tilt About X | : | 0 |
| Tilt About Y | : | −8.2455704 |
| Tilt About Z | : | 0 |
| Order | : Tilt then decenter | |
| Surface 41 | : COORDBRK | |
| Decenter X | : | −129.0656 |
| Decenter Y | : | 0 |
| Tilt About X | : | 0 |
| Tilt About Y | : | 8.1186582 |
| Tilt About Z | : | 0 |
| Order | : Decenter then tilt | |
| Surface 42 | : STANDARD | |
| Surface 43 | : STANDARD | |
| Surface 44 | : COORDBRK | |
| Decenter X | : | −3821.527 |
| Decenter Y | : | 0 |
| Tilt About X | : | 0 |
| Tilt About Y | : | −90 |
| Tilt About Z | : | 0 |
| Order | : Decenter then tilt | |
| Surface 45 | : COORDBRK | |
| Decenter X | : | −4011.6642 |
| Decenter Y | : | 0 |
| Tilt About X | : | 0 |
| Tilt About Y | : | 0 |
| Tilt About Z | : | 0 |
| Order | : Decenter then tilt | |
| Surface 46 | : SUPERCON | |
| Maximum term | : | 1 |
| U sub 1 | : | 0 |
| Surface 47 | : COORDBRK | |
| Decenter X | : | 4011.6642 |
| Decenter Y | : | 0 |
| Tilt About X | : | 0 |
| Tilt About Y | : | 0 |
| Tilt About Z | : | 0 |
| Order | : Tilt then decenter | |
| Surface 48 | : COORDBRK | |
| Decenter X | : | 3821.527 |
| Decenter Y | : | 0 |
| Tilt About X | : | 0 |
| Tilt About Y | : | 90 |
| Tilt About Z | : | 0 |
| Order | : Tilt then decenter | |
| Surface 49 | : COORDBRK | |
| Decenter X | : | 0 |
| Decenter Y | : | 0 |
| Tilt About X | : | 0 |
| Tilt About Y | : | −90 |
| Tilt About Z | : | 0 |
| Order | : Decenter then tilt | |
| Surface 50 | : COORDBRK | |
| Decenter X | : | 0 |
| Decenter Y | : | 0 |
| Tilt About X | : | 0 |
| Tilt About Y | : | 0 |
| Tilt About Z | : | 0 |
| Order | : Decenter then tilt | |
| Surface IMA | : STANDARD | |

FIG. 10 Embodiment

In the prescription of the system illustrated in FIG. 10 as described by the Zemax prescription shown in Table 5 below, the coordinate system has been rotated by 90 degrees about the z-axis. This makes the plane of symmetry the x-z plane. The horizontal axis of this system is the y-axis and the vertical axis is the x-axis.

In this system, there are 3 groups of refractive optics and one reflective surface (not shown). Each group is tilted and decentered with respect to the optical axis of the system. Lenses within a group are aligned along a common axis of that group.

Group 1 in this system has the majority of its optical power in the horizontal direction. This power is provided by 3 cylindrical elements with curvature in the y-direction and one aspheric cylindrical surface, also with power in the horizontal direction. The sign of the optical power of this group is positive. There is also one rotationally-symmetric surface within this group, which in this case is aspheric. The cylindrical elements in this group are all made of optical glass. The lens which includes the aspheric rotationally symmetric surface and aspheric cylindrical surface comprises a polymer material.

Group 2 in this system is aligned with its optical axis parallel to Group 1. This is not a requirement for the optimum performance of the system. The optical power of Group 2 is substantially rotationally symmetric. The sign of the optical power of this group is positive. There are 3 rotationally symmetric spherical elements in this group, one aspheric cylindrical surface with power in the horizontal direction, and one rotationally symmetric aspheric surface. The rotationally symmetric spherical elements in this group are all made of optical glass. The lens which includes the aspheric rotationally symmetric surface, and aspheric cylindrical surface comprises a polymer material.

Group 3 in this system has the majority of its optical power in the horizontal direction. This power is provided by 3 cylindrical elements with curvature in the y-direction and one aspheric cylindrical surface, also with power in the horizontal direction. The sign of the optical power of this group is negative. There is also one rotationally symmetric spherical element and one rotationally symmetric surface, which in this case is aspheric. The cylindrical elements and the rotationally symmetric spherical element in this group are all made of optical glass. The lens which includes the aspheric rotationally symmetric surface and aspheric cylindrical surface comprises a polymer material.

The reflective surface in this system is a section of a rotationally symmetric spherical surface. This element allows for the prevention of keystone distortion in the system.

The use of optical glass in each of the groups allows for the correction of chromatic aberrations within each group. The use of two groups that have the majority of their powers in the horizontal direction (and are therefore anamorphic) allows for the correction of anamorphic distortion in the system by expanding the image in the horizontal direction.

Of course, with respect to the Zemax prescription shown in Table 5 below, other surface data values for each individual element/group will become apparent to those of ordinary skill in the art in light of the present disclosure and may therefore be determined through routine experimentation dependent on the overall configuration and positioning of the individual elements/groups within the optical system (including the above-mentioned tilting), the value for incident angle $\theta$, and the quality of the image desired.

TABLE 5

Figure 10:
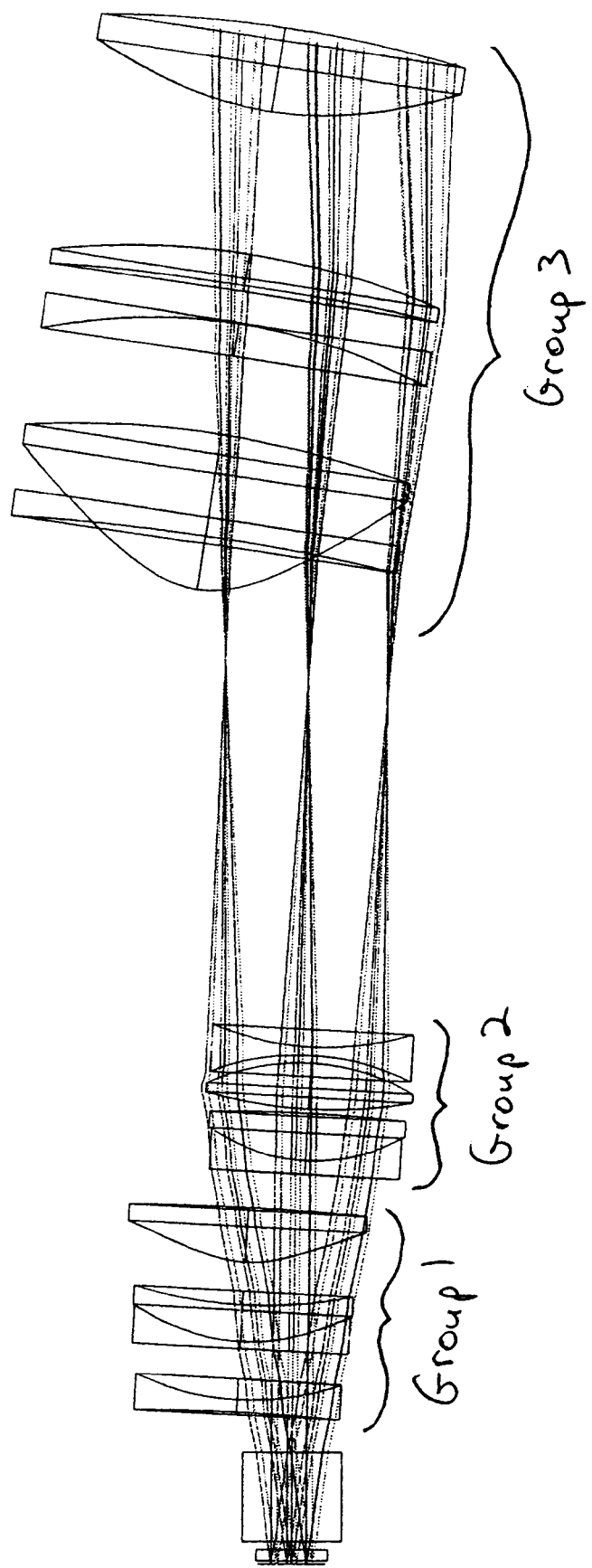
FIG. 10 is a side view cross sectional schematic illustrating an optical system comprising a 3-group lens system, in accordance with another preferred embodiment of the present invention.

ZEMAX Software Output Describing Surface Data Summary and Detail for Each Individual Element within the Optical System shown in FIG. 10

SURFACE DATA SUMMARY:

| Surf | Type | Radius | Thickness | Glass | Diameter | Conic |
|---|---|---|---|---|---|---|
| OBJ | STANDARD | Infinity | 8000 | | 17.828 | 0 |
| STO | STANDARD | Infinity | −8000 | | 3265.986 | 0 |
| 2 | STANDARD | Infinity | 0.864763 | | 17.828 | 0 |
| 3 | STANDARD | Infinity | 2.851319 | PK2 | 18.17911 | 0 |
| 4 | STANDARD | Infinity | 2.189276 | | 18.93415 | 0 |
| 5 | STANDARD | Infinity | 23.4 | BK7 | 19.82304 | 0 |
| 6 | STANDARD | Infinity | 0 | | 26.02538 | 0 |
| 7 | STANDARD | Infinity | 31.92602 | | 26.02538 | 0 |
| 8 | COORDBRK | — | 0 | | — | — |
| 9 | COORDBRK | — | 0 | | — | — |
| 10 | TOROIDAL | 458.4196 | 9.3 | LAKN13 | 52.91882 | 0 |
| 11 | TOROIDAL | −74.35244 | 8.22411 | | 54.10674 | 0 |
| 12 | TOROIDAL | Infinity | 10 | BAF52 | 55.44354 | 0 |
| 13 | TOROIDAL | −53.95893 | 5 | SFL6 | 56.93255 | 0 |
| 14 | TOROIDAL | −118.3985 | 17.09566 | | 57.69251 | 0 |
| 15 | TOROIDAL | −76.4892 | 5 | POLYCARB | 61.76582 | 0 |
| 16 | EVENASPH | −967.8181 | 9.413104 | | 62.55276 | 0 |
| 17 | COORDBRK | — | 0 | | — | — |
| 18 | STANDARD | 2933.115 | 3.7 | BASF64A | 47.33314 | 0 |
| 19 | STANDARD | 47.08976 | 12.5 | SK51 | 50.20025 | 0 |
| 20 | STANDARD | −405.1517 | 1.135289 | | 51.75378 | 0 |
| 21 | STANDARD | 124.1573 | 12 | SK51 | 54.20349 | 0 |
| 22 | STANDARD | −58.99821 | 2 | | 54.48123 | 0 |
| 23 | EVENASPH | −69.63492 | 7 | ACRYLIC | 52.96227 | 0 |
| 24 | TOROIDAL | −76.08594 | −38.33529 | | 53.003 | 0 |
| 25 | COORDBRK | — | −64.03287 | | — | — |
| 26 | COORDBRK | — | 141.1333 | | — | — |
| 27 | COORDBRK | — | 84.42051 | | — | — |
| 28 | STANDARD | −631.952 | 5 | SFL6 | 102.4629 | 0 |
| 29 | STANDARD | Infinity | 12 | | 102.4026 | 0 |
| 30 | COORDBRK | — | 0 | | — | — |
| 31 | TOROIDAL | −57.44037 | 5 | BK7 | 102.2208 | 0 |
| 32 | TOROIDAL | 262.743 | 25.72719 | | 102.1836 | 0 |
| 33 | TOROIDAL | 153.5677 | 9 | SF8 | 102.1143 | 0 |
| 34 | STANDARD | Infinity | 8 | | 102.304 | 0 |
| 35 | TOROIDAL | 582.2174 | 10 | ACRYLIC | 102.6182 | 0 |
| 36 | EVENASPH | −201.0492 | 50.08856 | | 102.6963 | 0 |
| 37 | TOROIDAL | −101.2245 | 7 | BK7 | 95.83301 | 0 |
| 38 | TOROIDAL | 339.4198 | −114.8158 | | 96.71805 | 0 |
| 39 | COORDBRK | — | −101.4205 | | — | — |
| 40 | COORDBRK | — | 0 | | — | — |

TABLE 5-continued

ZEMAX Software Output Describing Surface Data Summary and Detail for Each Individual Element within the Optical System shown in FIG. 10

| 41 | COORDBRK | — | 0 | | — | — |
|---|---|---|---|---|---|---|
| 42 | STANDARD | Infinity | 2000 | | 82.7022 | 0 |
| 43 | STANDARD | Infinity | 0 | | 1046.069 | 0 |
| 44 | COORDBRK | — | 0 | | — | — |
| 45 | STANDARD | −3916.949 | 0 | MIRROR | 1030.936 | 0 |
| 46 | COORDBRK | — | −430 | | — | — |
| 47 | COORDBRK | — | −92 | | — | — |
| 48 | COORDBRK | — | 0 | | — | — |
| IMA | STANDARD | Infinity | | | 1279.232 | 0 |

SURFACE DATA DETAIL:

| Surface OBJ | : STANDARD | | |
|---|---|---|---|
| Surface STO | : STANDARD | | |
| Surface 2 | : STANDARD | | |
| Surface 3 | : STANDARD | | |
| Surface 4 | : STANDARD | | |
| Surface 5 | : STANDARD | | |
| Surface 6 | : STANDARD | | |
| Surface 7 | : STANDARD | | |
| Surface 8 | : COORDBRK | | |
| Decenter X | : | | 131.59074 |
| Decenter Y | : | | 0 |
| Tilt About X | : | | 0 |
| Tilt About Y | : | | −10.526087 |
| Tilt About Z | : | | 0 |
| Order | : Decenter then tilt | | |
| Surface 9 | : COORDBRK | | |
| Decenter X | : | | −118.89482 |
| Decenter Y | : | | 0 |
| Tilt About X | : | | 0 |
| Tilt About Y | : | | 7.4498209 |
| Tilt About Z | : | | 0 |
| Order | : Decenter then tilt | | |
| Surface 10 | : TOROIDAL | | |
| Rad of rev. | : | | 0 |
| Coeff on $y^2$ | : | | 0 |
| Coeff on $y^4$ | : | | 0 |
| Coeff on $y^6$ | : | | 0 |
| Coeff on $y^8$ | : | | 0 |
| Coeff on $y^{10}$ | : | | 0 |
| Coeff on $y^{12}$ | : | | 0 |
| Coeff on $y^{14}$ | : | | 0 |
| Surface 11 | : TOROIDAL | | |
| Rad of rev. | : | | 0 |
| Coeff on $y^2$ | : | | 0 |
| Coeff on $y^4$ | : | | 0 |
| Coeff on $y^6$ | : | | 0 |
| Coeff on $y^8$ | : | | 0 |
| Coeff on $y^{10}$ | : | | 0 |
| Coeff on $y^{12}$ | : | | 0 |
| Coeff on $y^{14}$ | : | | 0 |
| Surface 12 | : TOROIDAL | | |
| Rad of rev. | : | | 0 |
| Coeff on $y^2$ | : | | 0 |
| Coeff on $y^4$ | : | | 0 |
| Coeff on $y^6$ | : | | 0 |
| Coeff on $y^8$ | : | | 0 |
| Coeff on $y^{10}$ | : | | 0 |
| Coeff on $y^{12}$ | : | | 0 |
| Coeff on $y^{14}$ | : | | 0 |
| Surface 13 | : TOROIDAL | | |
| Rad of rev. | : | | 0 |
| Coeff on $y^2$ | : | | 0 |
| Coeff on $y^4$ | : | | 0 |
| Coeff on $y^6$ | : | | 0 |
| Coeff on $y^8$ | : | | 0 |
| Coeff on $y^{10}$ | : | | 0 |
| Coeff on $y^{12}$ | : | | 0 |
| Coeff on $y^{14}$ | : | | 0 |
| Surface 14 | : TOROIDAL | | |
| Rad of rev. | : | | 0 |
| Coeff on $y^2$ | : | | 0 |
| Coeff on $y^4$ | : | | 0 |
| Coeff on $y^6$ | : | | 0 |
| Coeff on $y^8$ | : | | 0 |
| Coeff on $y^{10}$ | : | | 0 |

TABLE 5-continued

ZEMAX Software Output Describing Surface Data Summary and Detail for Each Individual Element within the Optical System shown in FIG. 10

| | | |
|---|---|---|
| Coeff on y^12 | : | 0 |
| Coeff on y^14 | : | 0 |
| Surface 15 | : TOROIDAL | |
| Rad of rev. | : | 0 |
| Coeff on y^2 | : | 0 |
| Coeff on y^4 | : | −1.5143547e − 006 |
| Coeff on y^6 | : | 1.5264842e − 010 |
| Coeff on y^8 | : | −1.8915853e − 012 |
| Coeff on y^10 | : | 0 |
| Coeff on y^12 | : | 0 |
| Coeff on y^14 | : | 0 |
| Surface 16 | : EVENASPH | |
| Coeff on r 2 | : | 0 |
| Coeff on r 4 | : | −1.5664381e − 007 |
| Coeff on r 6 | : | 1.6874274e − 011 |
| Coeff on r 8 | : | 5.0496463e − 015 |
| Coeff on r 10 | : | 0 |
| Coeff on r 12 | : | 0 |
| Coeff on r 14 | : | 0 |
| Coeff on r 16 | : | 0 |
| Surface 17 | : COORDBRK | |
| Decenter X | : | −14.213987 |
| Decenter Y | : | 0 |
| Tilt About X | : | 0 |
| Tilt About Y | : | 0 |
| Tilt About Z | : | 0 |
| Order | : Decenter then tilt | |
| Surface 18 | : STANDARD | |
| Surface 19 | : STANDARD | |
| Surface 20 | : STANDARD | |
| Surface 21 | : STANDARD | |
| Surface 22 | : STANDARD | |
| Surface 23 | : EVENASPH | |
| Coeff on r 2 | : | 0 |
| Coeff on r 4 | : | −6.888287e − 007 |
| Coeff on r 6 | : | −9.9254857e − 012 |
| Coeff on r 8 | : | −5.0725558e − 014 |
| Coeff on r 10 | : | 0 |
| Coeff on r 12 | : | 0 |
| Coeff on r 14 | : | 0 |
| Coeff on r 16 | : | 0 |
| Surface 24 | : TOROIDAL | |
| Rad of rev. | : | 0 |
| Coeff on y^2 | : | 0 |
| Coeff on y^4 | : | 2.0110127e − 008 |
| Coeff on y^6 | : | 3.3357953e − 010 |
| Coeff on y^8 | : | −6.3277848e − 013 |
| Coeff on y^10 | : | 0 |
| Coeff on y^12 | : | 0 |
| Coeff on y^14 | : | 0 |
| Surface 25 | : COORDBRK | |
| Decenter X | : | 14.213987 |
| Decenter Y | : | 0 |
| Tilt About X | : | 0 |
| Tilt About Y | : | 0 |
| Tilt About Z | : | 0 |
| Order | : Tilt then decenter | |
| Surface 26 | : COORDBRK | |
| Decenter X | : | 118.89482 |
| Decenter Y | : | 0 |
| Tilt About X | : | 0 |
| Tilt About Y | : | −7.4498209 |
| Tilt About Z | : | 0 |
| Order | : Tilt then decenter | |
| Surface 27 | : COORDBRK | |
| Decenter X | : | −70.289984 |
| Decenter Y | : | 0 |
| Tilt About X | : | 0 |
| Tilt About Y | : | 1.9596471 |
| Tilt About Z | : | 0 |
| Order | : Decenter then tilt | |
| Surface 28 | : STANDARD | |
| Surface 29 | : STANDARD | |
| Surface 30 | : COORDBRK | |
| Decenter X | : | 0 |
| Decenter Y | : | 0 |

TABLE 5-continued

ZEMAX Software Output Describing Surface Data Summary and Detail for Each Individual Element within the Optical System shown in FIG. 10

| | | |
|---|---|---|
| Tilt About X | : | 0 |
| Tilt About Y | : | 0 |
| Tilt About Z | : | 0 |
| Order | . Decenter then tilt | |
| Surface 31 | : TOROIDAL | |
| Rad of rev. | : | 0 |
| Coeff on y ^2 | : | 0 |
| Coeff on y ^4 | : | 0 |
| Coeff on y ^6 | : | 0 |
| Coeff on y ^8 | : | 0 |
| Coeff on y ^10 | : | 0 |
| Coeff on y ^12 | : | 0 |
| Coeff on y ^14 | : | 0 |
| Surface 32 | : TOROIDAL | |
| Rad of rev. | : | 0 |
| Coeff on y ^2 | : | 0 |
| Coeff on y ^4 | : | 0 |
| coeff on y ^6 | : | 0 |
| Coeff on y ^8 | : | 0 |
| Coeff on y ^10 | : | 0 |
| Coeff on y ^12 | : | 0 |
| Coeff on y ^14 | : | 0 |
| Surface 33 | : TOROIDAL | |
| Rad of rev. | : | 0 |
| Coeff on y ^2 | : | 0 |
| Coeff on y ^4 | : | 0 |
| Coeff on y ^6 | : | 0 |
| Coeff on y ^8 | : | 0 |
| Coeff on y ^10 | : | 0 |
| Coeff on y ^12 | : | 0 |
| Coeff on y ^14 | : | 0 |
| Surface 34 | : STANDARD | |
| Surface 35 | : TOROIDAL | |
| Rad of rev. | : | 0 |
| Coeff on y ^2 | : | 0 |
| Coeff on y ^4 | : | $-2.8095754e - 008$ |
| Coeff on y ^6 | : | $1.6273974e - 012$ |
| Coeff on y ^8 | : | $-1.1109635e - 014$ |
| Coeff on y ^10 | : | 0 |
| Coeff on y ^12 | : | 0 |
| Coeff on y ^14 | : | 0 |
| Surface 36 | : EVENASPH | |
| coeff on r 2 | : | 0 |
| Coeff on r 4 | : | $3.9772802e - 008$ |
| Coeff on r 6 | : | $-3.6127144e - 012$ |
| Coeff on r 8 | : | $4.9782626e - 016$ |
| Coeff on r 10 | : | 0 |
| Coeff on r 12 | : | 0 |
| Coeff on r 14 | : | 0 |
| Coeff on r 16 | : | 0 |
| Surface 37 | : TOROIDAL | |
| Rad of rev. | : | 0 |
| Coeff on y ^2 | : | 0 |
| Coeff on y ^4 | : | 0 |
| Coeff on y ^6 | : | 0 |
| Coeff on y ^8 | : | 0 |
| Coeff on y ^10 | : | 0 |
| Coeff on y ^12 | : | 0 |
| Coeff on y ^14 | : | 0 |
| Surface 38 | : TOROIDAL | |
| Rad of rev. | : | 0 |
| Coeff on y ^2 | : | 0 |
| Coeff on y ^4 | : | 0 |
| Coeff on y ^6 | : | 0 |
| Coeff on y ^8 | : | 0 |
| Coeff on y ^10 | : | 0 |
| Coeff on y ^12 | : | 0 |
| Coeff on y ^14 | : | 0 |
| Surface 39 | : COORDBRK | |
| Decenter X | : | 0 |
| Decenter Y | : | 0 |
| Tilt About X | : | 0 |
| Tilt About Y | : | 0 |
| Tilt About Z | : | 0 |
| Order | . Tilt then decenter | |
| Surface 40 | : COORDBRK | |

TABLE 5-continued

ZEMAX Software Output Describing Surface Data Summary and Detail for Each Individual Element within the Optical System shown in FIG. 10

| | | |
|---|---|---|
| Decenter X | : | 70.289984 |
| Decenter Y | : | 0 |
| Tilt About X | : | 0 |
| Tilt About Y | : | −1.9596471 |
| Tilt About Z | : | 0 |
| Order | : Tilt then decenter | |
| Surface 41 | : COORDBRK | |
| Decenter X | : | −116.96915 |
| Decenter Y | : | 0 |
| Tilt About X | : | 0 |
| Tilt About Y | : | 10.48382 |
| Tilt About Z | : | 0 |
| Order | : Decenter then tilt | |
| Surface 42 | : STANDARD | |
| Surface 43 | : STANDARD | |
| Surface 44 | : COORDBRK | |
| Decenter X | : | 0 |
| Decenter Y | : | 0 |
| Tilt About X | : | 0 |
| Tilt About Y | : | −6 |
| Tilt About Z | : | 0 |
| Order | : Decenter then tilt | |
| Surface 45 | : STANDARD | |
| Surface 46 | : COORDBRK | |
| Decenter X | : | 0 |
| Decenter Y | : | 0 |
| Tilt About X | : | 0 |
| Tilt About Y | : | 6 |
| Tilt About Z | : | 0 |
| Order | : Tilt then decenter | |
| Surface 47 | : COORDBRK | |
| Decenter X | : | 0 |
| Decenter Y | : | 0 |
| Tilt About X | : | 0 |
| Tilt About Y | : | −90 |
| Tilt About Z | : | 0 |
| Order | : Decenter then tilt | |
| Surface 48 | : COORDBRK | |
| Decenter X | : | −3.0189174 |
| Decenter Y | : | 0 |
| Tilt About X | : | 0 |
| Tilt About Y | : | 0 |
| Tilt About Z | : | 0 |
| Order | : Decenter then tilt | |
| Surface IMA | : STANDARD | |

Individual elements (e.g. lenses) mentioned throughout this disclosure may serve as part of more than one larger element. For example, lenses within Group 4 in each of FIGS. 7 and 8 (and lenses within Group 3 in FIG. 10) may serve as part of the anamorphic element as well as part of the telecentric element.

Those of ordinary skill in the art will recognize that many modifications and variations of the present invention may be implemented. The foregoing description and the following claims are intended to cover all such modifications and variations.

What is claimed is:

1. An optical system for projecting an image onto a display image plane at an incident angle θ which is greater than zero, comprising:
   an image source;
   an anamorphic telescope for reducing anamorphic distortion of the image, wherein the anamorphic telescope provides a first magnification of the image in a first direction and provides a second magnification of the image in a second direction which is perpendicular to the first direction, wherein the first magnification is different than the second magnification, wherein the anamorphic telescope comprises a first substantially cylindrical lens group and a second substantially cylindrical lens group, and wherein at least one substantially rotationally symmetric lens group is positioned between the first substantially cylindrical lens group and the second substantially cylindrical lens group.

2. The optical system of claim 1 further comprising a telecentric element, wherein the telecentric element comprises a reflective, refractive, diffractive, or combination element thereof.

3. The optical system of claim 1 further comprising a telecentric element, wherein the image source, the anamorphic telescope, and the telecentric element each effect a tilt on the image.

4. The optical system of claim 1 further comprising a telecentric element, wherein the telecentric element comprises a surface selected from the group consisting of spherical, cylindrical, toric, conic, elliptical, and combinations thereof.

5. The optical system of claim 1 further comprising a telecentric element, wherein the telecentric element comprises a Fresnel surface.

6. The optical system of claim 1 further comprising a telecentric element, wherein the telecentric element comprises a reflective element and at least one lens, and wherein the at least one lens simultaneously serves within the anamorphic telescope.

7. The optical system of claim 1 further comprising a telecentric element, wherein the telecentric element comprises a mirror and at least one lens, and wherein the at least one lens simultaneously serves within the anamorphic telescope.

8. The optical system of claim 1 further comprising a telecentric element, wherein the telecentric element comprises a refractive element.

9. The optical system of claim 1 further comprising a telecentric element, wherein the telecentric element comprises a diffractive element.

10. The optical system of claim 1 further comprising a telecentric element, wherein the telecentric element comprises a reflective element.

11. The optical system of claim 1 further comprising a telecentric element, wherein the telecentric element comprises a mirror.

12. The optical system of claim 1 further comprising a telecentric element, wherein the telecentric element comprises a reflective, refractive, diffractive, or combination element thereof, and wherein the telecentric element includes an optical axis which is perpendicular to the display image plane.

13. The optical system of claim 1 further comprising a telecentric element, wherein the telecentric element comprises a refractive element, and wherein the telecentric element includes an optical axis which is perpendicular to the display image plane.

14. The optical system of claim 1 further comprising a telecentric element, wherein the telecentric element comprises a diffractive element, and wherein the telecentric element includes an optical axis which is perpendicular to the display image plane.

15. The optical system of claim 1 further comprising a telecentric element, wherein the telecentric element comprises a reflective element, and wherein the telecentric element includes an optical axis which is perpendicular to the display image plane.

16. The optical system of claim 1 further comprising a telecentric element, wherein the telecentric element comprises a holographic element, and wherein the telecentric element includes an optical axis which is perpendicular to the display image plane.

17. The optical system of claim 1 further comprising a telecentric element, wherein the telecentric element comprises a holographic element.

18. The optical system of claim 1 further comprising a telecentric element, wherein the telecentric element comprises a holographic element, and wherein the holographic element is a volumetric, surface-relief, or combination type thereof.

19. The optical system of claim 1, wherein the at least one substantially rotationally symmetric lens group comprises two substantially rotationally symmetric lens groups.

20. The optical system of claim 1, wherein major axes of each of the first substantially cylindrical lens group and the second substantially cylindrical lens group are not crossed.

21. The optical system of claim 1, wherein at least two lens groups within the anamorphic telescope effects a tilt on the image.

22. An optical system for projecting an image onto a display image plane at an incident angle $\theta$ which is greater than zero, comprising:
  an image source;
  an anamorphic system for reducing anamorphic distortion of the image;
  a telecentric element, wherein the telecentric element comprises a reflective, refractive, diffractive, or combination element thereof, and wherein the telecentric element includes an optical axis which is perpendicular to the display image plane.

23. The optical system of claim 22, wherein the image source, the anamorphic system, and the telecentric element each effect a tilt on the image.

24. The optical system of claim 22, wherein the telecentric element comprises a surface selected from the group consisting of spherical, cylindrical, toric, conic, elliptical, and combinations thereof.

25. The optical system of claim 22, wherein the telecentric element comprises a Fresnel surface.

26. The optical system of claim 22, wherein the telecentric element comprises a reflective element and at least one lens, and wherein the at least one lens simultaneously serves within the anamorphic system.

27. The optical system of claim 22, wherein the telecentric element comprises a mirror and at least one lens, and wherein the at least one lens simultaneously serves within the anamorphic system.

28. The optical system of claim 22, wherein the telecentric element comprises a refractive element.

29. The optical system of claim 22, wherein the telecentric element comprises a diffractive element.

30. The optical system of claim 22, wherein the telecentric element comprises a reflective element.

31. The optical system of claim 22, wherein the telecentric element comprises a mirror.

32. The optical system of claim 22, wherein the telecentric element comprises a holographic element.

33. The optical system of claim 22, wherein the telecentric element comprises a holographic element, and wherein the holographic element is a volumetric, surface-relief, or combination type thereof.

* * * * *